United States Patent
Schneider et al.

(10) Patent No.: US 7,167,773 B2
(45) Date of Patent: Jan. 23, 2007

(54) PROCESS AND APPARATUS FOR IMPROVING AND CONTROLLING THE CURING OF NATURAL AND SYNTHETIC MOLDABLE COMPOUNDS

(75) Inventors: Scott Schneider, Littleton, CO (US); Richard Magill, Cheyenne, WY (US)

(73) Assignee: Signature Control Systems, Denver, CO (US)

( * ) Notice: Subject to any disclaimer, the term of this patent is extended or adjusted under 35 U.S.C. 154(b) by 0 days.

(21) Appl. No.: 11/077,915

(22) Filed: Mar. 11, 2005

(65) Prior Publication Data

US 2005/0173820 A1    Aug. 11, 2005

Related U.S. Application Data

(63) Continuation-in-part of application No. 10/800,079, filed on Mar. 11, 2004, which is a continuation-in-part of application No. 10/666,433, filed on Sep. 18, 2003, which is a continuation-in-part of application No. 10/267,197, filed on Oct. 8, 2002, now Pat. No. 6,855,791, said application No. 10/666,433 and a continuation-in-part of application No. 10/102,614, filed on Mar. 19, 2002, now Pat. No. 6,774,643, and a continuation-in-part of application No. 09/815,342, filed on Mar. 21, 2001, now abandoned.

(60) Provisional application No. 60/552,483, filed on Mar. 11, 2004, provisional application No. 60/394,736, filed on Jul. 9, 2002, provisional application No. 60/278,034, filed on Mar. 21, 2001.

(51) Int. Cl.
- *B29C 39/00* (2006.01)
- *G06F 19/00* (2006.01)
- *G06G 7/66* (2006.01)
- *G01F 1/00* (2006.01)

(52) U.S. Cl. ............... 700/198; 700/204; 700/205; 700/110; 702/47; 702/52; 702/53; 702/84; 425/135; 264/40.1

(58) Field of Classification Search ............ 700/2, 700/9, 11, 12, 19, 54, 95, 108–110, 198, 199, 700/200, 202–205; 702/47, 52, 53, 81–84, 702/176; 425/135; 264/40.1–40.7; 324/71.1
See application file for complete search history.

(56) References Cited

U.S. PATENT DOCUMENTS 2,765,219 A    10/1956   Shawhan (Continued)

FOREIGN PATENT DOCUMENTS

EP    0 540 103 B1    2/1996

(Continued)

OTHER PUBLICATIONS

U.S. Appl. No. 10/800,079, filed Mar. 11, 2004, Magill et al.

(Continued)

*Primary Examiner*—Leo Picard
*Assistant Examiner*—Sean Shechtman
(74) *Attorney, Agent, or Firm*—Sheridan Ross PC

(57) ABSTRACT

A process for curing a moldable compound under a plurality of curing conditions by: (1) obtaining time dependent data streams of dielectric or impedance values from a plurality of sensors distributed within a curing mold, wherein the moldable compound is a dialectric for each of the sensors; (2) determining impedance related measurements from the data streams for the plurality of sensors; (3) determining predictive and/or corrective curing actions for enhancing the curing process using the impedance related measurements for the plurality of sensors; and (4) controlling the mass production curing of parts to obtain cured parts having one or more desired properties.

32 Claims, 15 Drawing Sheets

U.S. PATENT DOCUMENTS

| | | | |
|---|---|---|---|
| 3,746,975 A | 7/1973 | Malthy | |
| 3,753,092 A | 8/1973 | Ludlow et al. | |
| 3,778,705 A | 12/1973 | Malthy | |
| 3,781,672 A | 12/1973 | Malthy et al. | |
| 3,807,055 A | 4/1974 | Kraxberger | 34/16.5 |
| 3,879,644 A | 4/1975 | Malthy | |
| 3,985,712 A | 10/1976 | Garst | |
| 4,107,599 A | 8/1978 | Preikschat | 324/61 |
| 4,261,525 A | 4/1981 | Wagner | 242/55.3 |
| 4,331,516 A | 5/1982 | Meighan | |
| 4,338,163 A | 7/1982 | Rittenhouse | |
| 4,344,142 A | 8/1982 | Diehr, II et al. | |
| 4,373,092 A | 2/1983 | Zsolnay | |
| 4,381,250 A | 4/1983 | Rittenhouse | |
| 4,389,578 A | 6/1983 | Wagner | 307/256 |
| 4,399,100 A | 8/1983 | Zsolnay et al. | |
| 4,423,371 A | 12/1983 | Senturia et al. | |
| 4,433,286 A | 2/1984 | Capots et al. | |
| 4,448,943 A | 5/1984 | Golba et al. | |
| 4,496,697 A | 1/1985 | Zsolnay et al. | |
| 4,510,103 A | 4/1985 | Yamaguchi et al. | |
| 4,510,436 A | 4/1985 | Raymond | |
| 4,515,545 A | 5/1985 | Hinrichs et al. | |
| 4,546,438 A | 10/1985 | Prewitt et al. | |
| 4,551,103 A | 11/1985 | Vitale | |
| 4,551,807 A | 11/1985 | Hsich et al. | |
| 4,580,233 A | 4/1986 | Parker et al. | 364/550 |
| 4,588,943 A | 5/1986 | Hirth | 324/61 |
| 4,676,101 A | 6/1987 | Baughman | |
| 4,683,418 A | 7/1987 | Wagner et al. | 324/61 |
| 4,710,550 A | 12/1987 | Kranbuehl | |
| 4,723,908 A | 2/1988 | Kranbuehl | |
| 4,773,021 A | 9/1988 | Harris et al. | |
| 4,777,431 A | 10/1988 | Day et al. | |
| 4,868,769 A | 9/1989 | Persson | |
| 4,881,025 A | 11/1989 | Gregory | |
| 4,896,098 A | 1/1990 | Haritonidis et al. | |
| 5,008,307 A | 4/1991 | Inomata | |
| 5,032,525 A | 7/1991 | Lee et al. | |
| 5,184,077 A | 2/1993 | Day et al. | |
| 5,201,956 A | 4/1993 | Humphrey et al. | |
| 5,207,956 A | 5/1993 | Kline et al. | |
| 5,208,544 A | 5/1993 | McBrearty et al. | |
| 5,210,499 A * | 5/1993 | Walsh | 324/649 |
| 5,219,498 A | 6/1993 | Keller et al. | |
| 5,223,796 A | 6/1993 | Waldman et al. | |
| 5,283,731 A | 2/1994 | Lalonde et al. | |
| 5,317,252 A | 5/1994 | Kranbuehl | |
| 5,432,435 A | 7/1995 | Strong et al. | |
| 5,453,689 A | 9/1995 | Goldfine et al. | |
| 5,459,406 A | 10/1995 | Louge | |
| 5,486,319 A | 1/1996 | Stone et al. | |
| 5,521,515 A | 5/1996 | Campbell | |
| 5,528,155 A | 6/1996 | King et al. | |
| 5,569,591 A | 10/1996 | Kell et al. | |
| 5,654,643 A | 8/1997 | Bechtel et al. | 324/687 |
| 5,749,986 A | 5/1998 | Wyatt | |
| 5,872,447 A | 2/1999 | Hager, III | |
| 5,874,832 A | 2/1999 | Gabelich | |
| 5,898,309 A | 4/1999 | Becker et al. | |
| 5,961,913 A | 10/1999 | Haase | |
| 5,996,006 A | 11/1999 | Speicher | |
| 6,043,308 A | 3/2000 | Tanahashi et al. | |
| 6,114,863 A | 9/2000 | Krahn et al. | 324/664 |
| 6,124,584 A | 9/2000 | Blaker et al. | 219/779 |
| 6,281,801 B1 | 8/2001 | Cherry et al. | 340/605 |
| 6,323,659 B1 | 11/2001 | Krahn | 324/554 |
| 6,472,885 B1 | 10/2002 | Green et al. | |
| 6,490,501 B1 * | 12/2002 | Saunders | 700/198 |
| 6,703,847 B2 | 3/2004 | Venter et al. | 324/663 |
| 6,708,555 B1 | 3/2004 | Lyons, Jr. et al. | 73/73 |
| 6,774,643 B2 | 8/2004 | Magill | |
| 6,784,671 B2 | 8/2004 | Steele et al. | 324/640 |
| 6,784,672 B2 | 8/2004 | Steele et al. | 324/663 |
| 6,855,791 B2 | 2/2005 | Van Doren et al. | |
| 6,989,678 B2 | 1/2006 | Venter et al. | 324/663 |
| 7,068,050 B2 | 6/2006 | Steele et al. | 324/640 |
| 7,068,051 B2 | 6/2006 | Anderson | 324/640 |
| 2002/0010068 A1 | 1/2002 | Komatsu | |
| 2002/0135385 A1 | 9/2002 | Magill | 324/663 |
| 2003/0062908 A1 | 4/2003 | Venter et al. | 324/661 |
| 2003/0146767 A1 | 8/2003 | Steele et al. | 324/640 |
| 2004/0124856 A1 | 7/2004 | Venter et al. | 324/664 |
| 2004/0133301 A1 | 7/2004 | Van Doren et al. | |
| 2004/0187341 A1 | 9/2004 | Studd et al. | 34/402 |
| 2005/0040832 A1 | 2/2005 | Steele et al. | 324/640 |

FOREIGN PATENT DOCUMENTS

| | | |
|---|---|---|
| EP | 0 743 153 A1 | 11/1996 |
| EP | 1 050 888 A1 | 11/2000 |
| EP | 0815458 B1 | 3/2003 |
| EP | 0 313 435 | 6/2005 |
| FR | 2 645 275 | 5/1992 |
| WO | WO 9534945 A2 | 12/1995 |
| WO | WO 9628741 A1 | 9/1996 |
| WO | WO 9704299 A1 | 2/1997 |
| WO | WO 9839639 A1 | 9/1998 |
| WO | WO 99/13346 | 3/1999 |
| WO | WO 0079266 A1 | 12/2000 |
| WO | WO 0101056 A1 | 1/2001 |
| WO | WO 03067275 A2 | 8/2003 |
| WO | WO 04/004998 | 1/2004 |
| WO | WO 2005069021 A1 | 7/2005 |

OTHER PUBLICATIONS

U.S. Appl. No. 09/815,342, filed Mar. 21, 2001, Van Doren et al.

"Automatic, Computer Controlled, Processing of Advanced Composites"; *Defense Small Business Innovation Research (SBIR) Program*; Apr. 7, 1988; 25 pgs.

Baumgartner et al.; "Computer Assisted Dielectric Cure Monitroing in Material Quality and Cure Process Control"; *SAMPE Journal*; Jul./Aug. 1983; pp. 6-16.

Buczek; "Considerations in the Dielectric Analysis of Composites"; 40th *International SAMPE Symposium*; May 8-11, 1995; pp. 696-710.

Buczek; "Self-Directed Process Control System for Epoxy Matrix Composites"; 40th *International SAMPE Symposium*; May 8-11, 1995; 8 pgs.

"Critical Point Control/Statistical Quality Control Software Module"; *Micromet Instruments*; 1993; 2 pgs.

Day; "Cure Characterization of Thick Polyester Composite Structures Using Dielectric and Finite Difference Analysis"; *Composite Material Technology; ASME*; 1993; PD-vol. 53:249-252.

Desanges; "Changes in the Electrical Properties of Natural Rubber/Carbon Black Compounds During Vulcaniation"; *Revue Generale du Caoutchouc*; Dec. 1957; 34(12); pp. 631-649.

"Dielectric Cure Testing on Polyester Bulk Molding Compound"; *Holometrix Micromet*; 2001; 3 pgs.: http://www.holometrix.com/holometrix/m_ materialtest.asp.

"Dielectric Sensors"; *NETZSCH*; Feb. 21, 2002; pgs.

"Eumetric System III Microdielectrometer . . . "; *Holometrix Micromet*; 2001; 5 pgs.

"ICAM-1000—In-mold Monitroing For SPC,SQC, and CPC (Critical Point Control) of Thermoset Molding Operations"; *Micromet Instruments, Inc.*; at least as early as Mar. 1990; 4 pgs.

"ICAM-1000 Industrial Cure Analysis & Monitoring System"; *Micromet Instruments, Inc.*; Aug. 1, 1991; 1 pg.

"ICAM-2000 Multi-Channel Cure Analyzer"; *Micromet Instruments*; 1993; 2 pgs.

Johnson et al.; "Production Implementation of Fully Automated, Closed Loop cure Control for Advanced Composite Strucutres"; 34th *International SAMPE Symposium*; May 8-11, 1989; pp. 373-384.

Keller et al.; "Computer Controlled Processing of Composites Utilizing Dielectric Signature Curves"; *SAMPE Journal*; Sep./Oct. 1992; 28(5); pp. 25-33.

Keller et al.; "Real Time, In-Situ Dielectric Monitoring of Advanced Composites Curing Processes"; *Programmed Composites, Inc.*; Aug. 1, 1987; 63 pgs.

Khastgir; "A Comparative Study of Step Curing and Continuous Curing Methods"; *Rubber World*; Jan. 1994; pp. 28-31.

"Lockheed Signature Process Control for Composites Proposal"; *Ketema Programmed Composites, Inc.*; Jul. 1, 1993; pp. 1-12.

"MDE Series 10 Cure Monitor"; *Holometrix Micromet*; at least as early as Mar. 15, 2000; 2 pgs.

"Mono-Probe"; *TYT-NAM-MON*Oct. 27, 2000; 1 pg.

"Northrop Aircraft Division RTM System Proposal"; *Ketema Programmed Composites, Inc.*; Apr. 1, 1993; 13 pgs.

"Notification of Transmittal of the International Search Report or the Declaration" from the Patent Cooperation Treaty in International Patent Application No. PCT/US02/32480 filed Oct. 9, 2002.

O'Conor et al.; "Update to the Jun. 1990 Confidential Descriptive Memorandum"; *Micromet Instrument, Inc.*; Dec. 1, 1990; 17 pgs.

Persson; "A Novel Method of Measuring Cure—Dielectric Vulcametry"; *Plastics and Rubber Processing and Applications*; 1987; 7(2); pp. 111-125.

"Prepreg Cure Characterization Using Simultaneous Dynamic Mechanical Analysis-Dielectric Analysis (DMA-DEA); *Perkin Elmer Thermal Analysis Newsletter*", (date unknown); 4 pp.

"Product Selection Grid"; *Holometrix Micromet*; 2001; 1 pg.; http://www.holometrix.com/holometrix/m_prgrid.asp.

Rajeshwar; "AC Impedance Spectroscopy of Carbon Black-Rubber Composites"; *Department of Chemistry and Biochemistry at The University of Texas as Arlington*; Sep. 21-24, 1999; 13 pgs.

SmartTrac Advertisement, *Automotive News*; May 21, 2001, 1 pg.

"SmartTrac"; *Innovative Aftermarket Systems, Inc.*; 2001; 2 pgs. http://www.ias-inc.net/pages/products/smart.html.

"Textron Aerostructures Autoclave Process Control Proposal"; *Ketema Programmed Composites, Inc.*; Feb. 12, 1993; 16 pgs.

"The Eumetric System III Microdielectrometer"; *Micromet Instruments, Inc.*; Sep. 1991; 4 pgs.

"Thermokinetics"; *NETZSCH*; ; Nov. 8, 2001; 2 pgs.

"Tool Mount Sensors"; http://www.micromet.com/home/rds.htm; (date unknown); 2 pp.

"Tool Mount Sensors"; *NETZSCH*; Feb. 21, 2002; 2 pgs.

"Vulcanization of Natural Rubber"; *NETZSCH*; Nov. 8, 2001; 2 pgs.

"Wagner Electronics, Inc.-Press Releases"; 2001, 2002, 2004, and 2005; 5 pages; Wagner Products Inc.

"Wellons true capacitive moisture meter system"; Available at http://www.wellonsusa.com/tcs.html; Undated; 1 page; Wellons Inc.

"Prepreg Cure Characterization Using Simultaneous Dynamic Mechanical Analysis-Dielectric Analysis (DMA-DEA)"; Perkin Elmer Thermal Analysis Newsletter, Available at http://www.thermal.instruments.com/Applications/petan055.pdf; Undated; 4 pages.

* cited by examiner

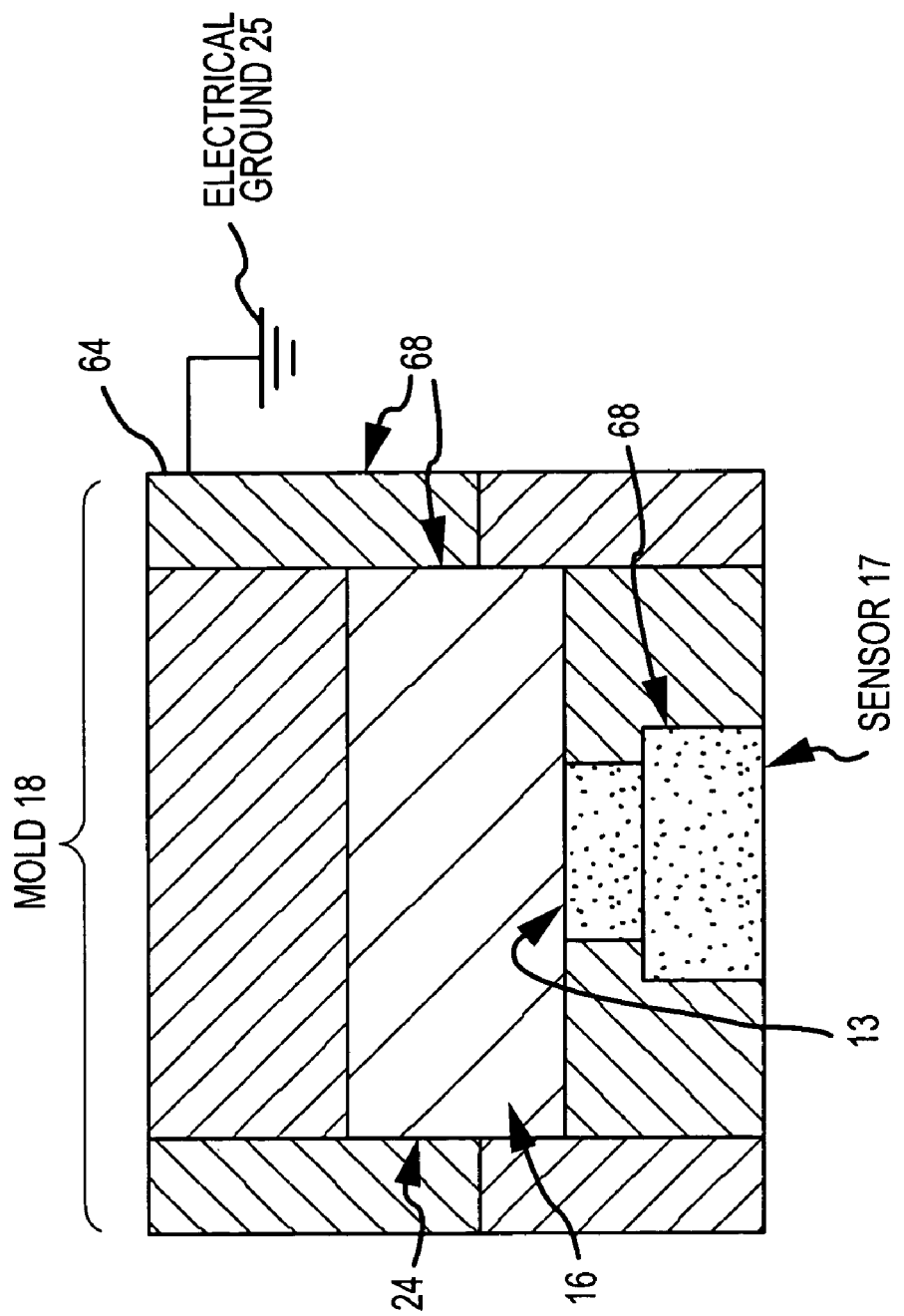

PROCESS AND APPARATUS FOR IMPROVING AND CONTROLLING THE CURING OF NATURAL AND SYNTHETIC MOLDABLE COMPOUNDS

CROSS REFERENCE TO RELATED APPLICATIONS

The present application claims the benefit of U.S. Provisional No. 60/552,483 filed Mar. 11, 2004, additionally the present application is a continuation-in-part of U.S. patent application Ser. No. 10/800,079 filed Mar. 11, 2004 which is a continuation-in-part of U.S. patent application Ser. No. 10/666,433 filed Sep. 18, 2003 which is a continuation-in-part of U.S. patent application Ser. No. 10/267,197 filed Oct. 8, 2002 (now U.S. Pat. No. 6,855,791), which claims the benefit of U.S. Provisional Patent Application Ser. No. 60/394,736 filed Jul. 9, 2002; U.S. patent application Ser. No. 10/666,433 is also a continuation-in-part of U.S. patent application Ser. No. 09/815,342 filed Mar. 21, 2001, now abandoned and is also a continuation-in-part of U.S. patent application Ser. No. 10/102,614 filed Mar. 19, 2002 (now U.S. Pat. No. 6,774,643), which claims the benefit of U.S. Provisional Patent Application Ser. No. 60/278,034 filed Mar. 21, 2001; the entire disclosure of these prior applications is considered to be part of the disclosure of this application and is hereby incorporated by reference.

RELATED FIELD OF THE INVENTION

This invention relates to a process and apparatus for monitoring and controlling the curing and solidification of natural and synthetic moldable compounds. Typical of such moldable compounds are polymeric compounds.

BACKGROUND OF THE INVENTION

Heretofore methods of applying fixed process parameters to the processing of moldable polymeric compounds during curing and/or solidification have resulted in both reduced productivity due to overly conservative cure times, and poor product uniformity due to the inability of the fixed process parameters to accommodate the inherent variability in the curing and/or solidification process.

Attempts have been made to analyze dielectric properties for determining the cure state of a curing part. In particular, the following references, incorporated fully herein by reference, disclose various techniques that may be related to analyzing curing states and/or solidification processes:

| U.S. PATENT DOCUMENTS | | | |
|---|---|---|---|
| 4,344,142 | filed Aug. 6, 1975 | with inventor(s) | Diehr, II et al. |
| 4,373,092 | filed Dec. 29, 1980 | with inventor(s) | Zsolnay |
| 4,399,100 | filed Dec. 29, 1980 | with inventor(s) | Zsolnay, et al. |
| 4,423,371 | filed Sep. 3, 1981 | with inventor(s) | Senturia, et al. |
| 4,496,697 | filed Aug. 24, 1982 | with inventor(s) | Zsolnay, et al. |
| 4,510,103 | filed Sep. 19, 1983 | with inventor(s) | Yamaguchi, et al. |
| 4,551,807 | filed Aug. 17, 1983 | with inventor(s) | Hinrichs, et al. |
| 4,723,908 | filed May 1, 1985 | with inventor(s) | Kranbuehl |
| 4,777,431 | filed Jun. 27, 1986 | with inventor(s) | Day, et al. |
| 4,773,021 | filed Sep. 20, 1988 | with inventor(s) | Harris, et al. |
| 4,868,769 | filed Sep. 19, 1989 | with inventor(s) | Persson, et al. |
| 5,032,525 | filed Mar. 31, 1988 | with inventor(s) | Lee, et al. |
| 5,219,498 | filed Nov. 12, 1991 | with inventor(s) | Keller, et al. |
| 5,317,252 | filed Sep. 15, 1992 | with inventor(s) | Kranbuehl |
| 5,486,319 | filed Dec. 29, 1993 | with inventor(s) | Stone, et al. |
| 5,528,155 | filed Jun. 18, 1996 | with inventor(s) | King, et al. |
| 5,872,447 | filed Sep. 10, 1997 | with inventor(s) | Hager, III |

OTHER PUBLICATIONS

*A comparative study of step curing and continuous curing methods,* 1994, D. Khastgir, Indian Institute of Technology

*AC Impedance Spectroscopy of Carbon Black-Moldable composites,* 1999, K. Rajeshwar, University of Texas at Arlington

*Anelastic and Dielectric Effects in Polymeric Solids,* 1967, N. G. McCrum, B. E. Read, and G. Williams The curing and solidification arts for manufacturing parts has provided some relationships between the dielectric (herein also referred to as "impedance") properties of, e.g., polymeric resins and the curing and/or solidification of such resins. However, none of the prior art associated with polymeric moldable curing and/or solidification fully addresses the practical aspects of taking electrical or impedance measurements directly in the production process, especially in the highly abrasive and high pressure environment of injection or other types of molding. Additionally the prior art is not satisfactory in disclosing the use of electrical data obtained to achieve closed-loop control of the curing or/and solidification processes of, e.g., polymeric moldable compounds over a wide range of molding methods and conditions. In particular, the prior art does not provide a solution or disclosure that is effective for reducing defective parts during the molding of large parts via curing and/or solidifying of polymeric compounds. More particularly, the prior art does not disclose effective techniques for using electrical (i.e., impedance) data samples from in-mold curing and/or solidification processes, wherein such data samples are simultaneously received from a plurality of in-mold sensors distributed in a manner so that the curing and/or solidification state of different portions of large parts can be evaluated.

The prior art also does not show how to compensate, in the curing and/or solidification process: (a) for variations in polymeric moldable curing compounds from batch to batch and within batches, and (b) for differences in material thickness. Additionally, the prior art does not compensate for additional variables, which are introduced into the process by the nature of the equipment, tooling, and thermal history of polymeric moldable curing compounds.

Moreover, the prior art uses dielectric or impedance measuring sensors, which employ opposing and parallel electrodes of precise area and separation distance, and in which, the electrodes are in direct contact with the moldable compound. Although such electrodes and sensors provide a means for measuring impedance properties during cure and/or solidification, they may be impractical for use in a part production environment. For example, many moldable components are produced using part molding technology which subjects such sensors to pressures up to 30,000 psi and temperatures up to 425° F., as well as survive in a highly abrasive environment (e.g., due to the flow of moldable compounds over the sensors). Finally, such prior art sensors must also be able to survive mold cleaning via typical cleaning methods such as $CO_2$ and plastic bead blast.

Accordingly, the above described drawbacks are addressed by the curing method and system disclosed hereinbelow. Additionally, since cure time safety margins (i.e., curing time beyond what is believed generally needed) are required and/or standard practice for plastic molders due to the inherent variability in curing processes for moldable compounds, it is desirable to have a real-time feedback curing control system which reduces the plastic molder's safety margins and concurrently prevents increased scrap and part production upsets. The curing method and system disclosed hereinbelow also addresses the desire for a real-time feedback curing control system.

DEFINITIONS AND TERMS

Numerous technical terms and abbreviations are used in the disclosure below. Accordingly, many of these terms and abbreviations are described in this section for convenience. Thus, it is suggested that this section be consulted to obtain a description of terms used herein.

Confidence interval: A range of values within which a particular number indicative of a likelihood of an event or condition occurring, e.g., a range of probabilities such as 0.8 to 1.0.

Cure: As used hereinbelow this term refers to both: (a) a chemical transformation of a polymeric compound that undergoes cross-linking, from a softened structure to a ridge structure, and (b) a hardening of a malleable polymeric compound so that it solidifies into a rigid structure without a chemical transformation.

Exponential Amplitude Coefficient: The amplitude coefficient (A) as defined by a best exponential fit to a set of raw data, where the fit curve (y) is described by the equation $y=Ae^{-\alpha t}$, where t is time.

Exponential Dampening: The damping coefficient ($\alpha$) as defined by a best exponential fit to a set of raw data, where the fit curve (y) is described by the equation:

$y=Ae^{-\alpha t}$, where t is time.

Impedance Data Stream: For each sensor operative during a curing and/or solidification process for detecting impedance changes within a curing part, a time series of values is obtained during part curing, wherein these values are indicative of impedance measurements of a corresponding capacitor circuit (CC) provided by, e.g., the sensor, the part mold and the moldable compound therein. In particular, each of the capacitor circuits is operatively configured so that the moldable compound becomes a dielectric for the corresponding capacitor circuit. Moreover, the impedance data stream segments mentioned herein are more fully described in the U.S. patent application Ser. No. 10/800,079, filed Mar. 11, 2004 fully incorporated herein by reference.

Low CTE Metallic Material: A material with a low coefficient of thermal expansion.

Moldable Compound: This term refers to (a) polymeric moldable compounds, (b) stryrene monomer compounds (SMC), (c) phenolic materials, and (d) thermosetting plastics, such as phenolic, urea, melamine, melamine-phenolic, epoxy, unsaturated polyester; note that the terms "polymeric moldable compounds", SMC, and "phenolic materials" are described in this Terms and Definitions section.

Phenolic Material: A moldable plastic material formed by the reaction of formaldehyde [HCHO] and phenol [C6H5OH], although almost any reactive phenol or aldehyde can be used. The material can be heavily reinforced or "filled" with glass fibers or other materials. Phenolics are known for their high impact strength, excellent wear characteristics, and dimensional stability over a wide temperature range. Phenolics can be thermoset molded. The phenols used commercially are phenol, cresols [CH3C6H4OH], xylenols [(CH3)2C6H3OH], p-t-butylphenol [C4H9C6H4OH], p-phenylphenol [C6H5C6H4H], bisphenols [(C6H4OH)2], and resorcinol [C6H4(OH)2]. The aldehydes used are formaldehyde and furfural [C4H3CHO]. In the uncured and semi-cured condition, phenolic resins are used as adhesives, casting resins, potting compounds, and laminating resins. As molding powders, phenolic resins can found in electrical uses.

Process curve: Impedance data derived from a corresponding impedance data stream (this term being described above), wherein the values in the impedance data stream have been "smoothed" (or otherwise manipulated) so that curve slopes and other mathematical curve characteristics can be more easily determined. Examples of operations for smoothing the impedance data stream are:

(a) For each segment of one or more predefined time segments for the impedance data stream, determine a linear least-squares best fit on the segment entries, and the slope of the resulting line (i.e., m, in the equation y=mx+b). The process curve then becomes the end-to-end sequence of lines determined;

(b) For each of one or more predetermined time segments for the impedance data stream, determine a best fit $3^{rd}$ order polynomial that models the impedance data stream entries in the segment; and (c) For each segment of one or more predefined time segments for the impedance data stream, determine an exponential best fit that models the impedance data stream entries in the segment, wherein at least the damping coefficient for such an exponential best fit is determined, and in some embodiments both the dampening and amplitude coefficients are determined (i.e., both a and A in the following equation $y=Ae^{-\alpha x}$ is determined).

The process curve then becomes the concatenation of the curves generated for each of the one or more time segments. Note that a process curve may be derived from a single time segment that is substantially the entire curing time for a part. However, in general, such time segments may be limited to a percentage of the curing time in a range of 10% to 35%.

Of course other smoothing operators are within the scope of novel curing system disclosed herein, such as spline curves (e.g., whose shape can be controlled by "control points" computed from values of the impedance data stream.

R-square ($R^2$): R-square (also known as the coefficient of determination) is a statistical measure of the reduction in the total variation of a dependent variable due to corresponding independent variables. An R-square value close to 1.0 indicates that a corresponding data model accounts for almost all of the variability in the respective variables.

Moldable Polymeric Compounds (equivalently, "Polymeric Moldable Compounds"): This term refers to:
(a) typical base moldable polymeric compounds,
(b) phenolic compounds, and
(c) phenolic compounds in combination with other materials including (but not limited to) a mineral filled phenolic, glass filled phenolic, cellulose phenolics filled with (but not limited to) cotton, PTFE (i.e., polytetrafluoroethylene), wood flour, and graphite.

Additionally, included within the term "moldable polymeric compounds" are: polyethylene co methacrylic acid, Nylon, polycarbonates, polychlorotrifluoroethylene, polyethylene co acrylic acid, polyetheretherketone, polyethylene naphthalate, polyethylene terephthalate, polymethyl methacrylate, polyoxymethylene, polyvinyl chloride, polyvinylidene chloride, polyvinylidene fluoride, polyvinyl fluoride, styrene acrylanitrile, polyethylene, acrylonitrile butadiene styrene, acyrlic styrene acrylanitrile, polyamide-imide, polybutylene terephthalate, polycarbonate/acrylonitrile butadiene styrene, polycarbonate/polybutylene terephthalate, polyetherimide, polyethersulfone, polyimides, polyphenylene oxide, polyphenylene sulfide, polysulfones, styrene maleic anhydride, thermoplastic elastomer, polypropylene, polystyrene, thermoplastic olefin, polytetrafluoroethylene, and mixtures thereof; i.e., thermo-plastic materials, as one skilled in the art will understand.

SMC: A styrene monomer compound such as a polyester resin which typically contains about 35% by weight styrene monomer, but can vary in a range of approximately 0% to 50%.

Tonnage: Compressive force of the molding press, in general, in tons.

Tool Steel: A steel suitable for use in making injection and compression molds such as AISI Type A2 Tool Steel.

Topological Features of Impedance Related Data: Recognizable and distinct features within a process curve, such as curve slopes, a peak (e.g., local maxima), a valley (e.g., local minima), a flat (e.g., substantially zero slope), inflection points, rate of change of the curve slope, etc.

Vacuum Port: A port machined in a mold for reducing the pressure in the mold cavity below atmospheric pressure.

SUMMARY OF THE INVENTION

The present disclosure is directed to a method and system for controlling the curing (as this term is described in the Definitions and Terms section hereinabove) and forming of molded parts from a moldable compound (as this term is also described hereinabove). In particular, the resulting molded parts from the herein disclosed curing method and system:

(a) may be both more fully formed and more fully cured (but not over cured);

(b) have consistent and repeatable part properties including reduced (or no) blistering and/or porosity;

(c) have desired properties such as: compressive strength, adhesion to dissimilar materials, dimensional consistency, etc.; and (d) cured in a reduced average curing time per part (e.g., up to about 38%).

Additionally, the curing method and system disclosed herein:

Is robust and repeatable in a conventional part production environment, such as in an environment that produces a high volume automotive SMC molded parts;

Automatically adjusts cure times to compensate for mold temperature fluctuations while simultaneously manufacturing consistent parts;

Shows the impact of in-mold introduction or placement of a moldable compound on cure rates of part using multiple impedance detection sensors provided in the mold (as described hereinbelow);

Identifies flow anomalies of the moldable compound during part curing, and provides feedback to efficiently change curing process variables to improve the molding process; and Identifies variations in the moldable compound being cured, and provides a mechanism to continually improve part formation.

The curing method and system disclosed herein includes novel features for monitoring and controlling both the flow of the moldable compound in the mold, and the polymerization or cross linking of a moldable compound. Moreover, such monitoring and controlling can be performed in real-time, i.e., during the curing (e.g., thermosetting) of a part so that there can be a reduction in the number of defective parts produced.

Additionally, the curing method and system disclosed herein can eliminate much of the cure time safety margins that are currently used to assure that parts (particularly relatively large parts) are properly formed and cured.

The present disclosure is generally directed to a novel curing method and system, wherein there are a plurality of sensors operatively distributed within a mold for detecting the state of part formation and the state of cure at various spaced apart portions of the part. Thus, the output from the multiple sensors can be used for determining whether and/or when the mold is being properly filled with the moldable compound, and whether and/or when the part is both curing properly and at a substantially uniform rate throughout the part.

For each sensor of the plurality of sensors operative during the curing process, a data stream of impedance values is obtained (denoted herein as an "impedance data stream"), wherein these values are indicative of impedance measurements obtained from a corresponding capacitor circuit (CC) provided by the sensor, the part mold and the moldable compound therein. In particular, each of the capacitor circuits is operatively configured so that the moldable compound becomes a dielectric for the corresponding capacitor circuit. For each of the impedance data streams, there may be a corresponding "process curve" (as described in the Definitions and Terms section hereinabove). Moreover, such a process curve can be represented as the graph of the time series of the impedance measurements of the corresponding impedance data stream. Note that such a process curve may be, but is not required, to be a completely smoothed representation of the impedance data stream; however, the process curve may be the concatenation of curve segments that are smooth (e.g., continuous first derivatives), as one skilled in the art will understand. Such impedance data streams and their corresponding process curves provide indications or "signatures" that are indicative of how a part is forming and curing within its mold. In particular, various geometric features of the process curves (e.g., slopes, local maxima, local minima, inflexion points, etc.) have been determined to be predictive of well formed, properly cured parts as well as various part defects. Accordingly, the method and system disclosed herein uses characteristics obtained from the process curves (e.g., shape and/or geometric curve characteristics such as slopes and/or an area under such a process curve.) of a plurality of sensors for determining proper and/or improper curing states at various locations within mold. Note that such impedance data streams can be representative of a time series of one or more of the following impedance types of impedance values: the impedance (Z) (i.e., a measure of the total opposition to current flow in an alternating current circuit, made up of two components, ohmic resistance and reactance, and usually represented in complex notation as $Z=R+iX$, where R is the ohmic resistance and X is the reactance), the phase angle (ø), the resistance (R), the reactance (X), the conductance (G), and/or the capacitance (C).

Additionally, for each sensor, there may be plurality of the impedance data streams (and their related process curves) generated. For example, for a given sensor, such an impedance data stream can be derived from the signal responses output by the activation of the corresponding capacitor circuit, wherein such activation is the result of one of a plurality of predetermined different signal frequencies input to the capacitor circuit. Thus, each of the process curves may be obtained from a corresponding single signal frequency that is input to the capacitor circuit having the sensor, and the corresponding shape (or other computational characteristics) of the resulting process curve may be used in monitoring, controlling and/or predicting an outcome of the part curing process.

In some embodiments disclosed herein, various time series capacitor circuit output data components (e.g., impedance (Z), phase angle (ø), resistance (R), reactance (X), conductance (G), or capacitance (C)) can be separately processed for monitoring and controlling the part curing process. Thus, process curves resulting from these different data components can provide distinctive shapes (or other features), whose characteristics can be used in monitoring and controlling the curing process. For example, such characteristics may include a process curve local maxima, or a local minima, a curve slope(s), a rate of slope, an identification of a process curve portion having substantially zero slope, an inflection point, the area under a portion of the process curve, etc.

Process curves obtained from a plurality of such in-mold sensors may be compared or evaluated both individually and in groups for detecting variations and/or abnormalities in the curing states of various portions of a part (particularly, a relatively large part such as an automobile dash). Thus, localized anomalies in the curing of a part may be detected by evaluating characteristics of a process curve derived from the output of a nearby sensor, or by comparing such process curve characteristics with corresponding characteristics from process curves for other sensors. Regarding such comparisons, the following may be compared:

(a) for a particular elapsed time in the curing of a part, the average slope of a portion of the process curve for one sensor monitoring the curing of the part with the average slope of a corresponding portion of a process curve from another sensor monitoring the curing of the part;

(b) the maximum value of a process curve for one sensor monitoring the curing of the part with the maximum value of a process curve from another sensor monitoring the curing of a part;

(c) when a part de-molds, the value of a process curve for one sensor monitoring the curing of the part with the value of the process curve from another sensor monitoring the curing of the part.

Such localized anomalies in part curing can be due to, e.g., a reduced flow of the moldable compound to a portion of the mold, and/or a portion of the curing part having a deviation from the cure rate of the rest of the part (e.g., due to part thickness variations, uneven heat distribution within the mold, etc.). Additionally, more global part curing evaluations may also be determined by, e.g., evaluating a degree of consistency (or lack thereof) between corresponding process curves (e.g., at the same impedance frequency) for the plurality of sensors outputting impedance data. For example, when such process curves have a similar shape but are offset in time from one another, this may indicate that different portions of the part may be curing a different rates, and, e.g., curing time adjustments and/or temperature adjustments may be required for various portions of the mold so that the entire part (or subsequent parts) cures properly.

It is a further aspect of the present curing method and system to use initial portions of the impedance data streams generated by the multiple sensors (within the mold) to adjust the curing conditions for subsequent molded parts (e.g., from the same mold) so that the moldable compound to be cured fully fills the mold substantially prior to the onset of curing. In particular, the mold press tonnage and the press closure rate may be adjusted to modify the curing rate, and more particularly, the onset of substantial cross linking in the curing moldable compound.

In at least some embodiments of the method and system of curing disclosed herein, prior to in-mass curing of parts of a particular part-type, a testing or sampling phase may be conducted for determining curing characteristics of samples of various compositions or batches of the moldable compound for the parts. For example, such samples may be cured: (a) with different arrangements of the moldable compound being provided in the mold, (b) at different curing temperatures, (c) for different lengths of time, (d) at different mold press tonnages. The resulting test parts and their corresponding process curves can be evaluated for determining adjustments to the curing process so that, e.g., an under cured sample part from a particular batch of the moldable compound (and having a particular introduction into the mold) may have its curing time lengthened and/or the mold temperature raised. Thus, by comparing the process curves derived from such sample tests with corresponding impedance data obtained during the curing of parts in production runs of the part-type (e.g., wherein thousands of instances of the part may be produced), a determination can be made as to whether a part is forming and curing appropriately or inappropriately. Moreover, if the part is curing and/or forming inappropriately, then an adjustment may be made to the curing process so that the resulting part is more likely to acceptable. In particular, such adjustments may cause the subsequent portions of the process curves (from the plurality of sensors) to better conform to the process curves of properly formed and cured parts. Thus, although such process curves between individual parts may vary in amplitude and/or relative timing of various curve characteristics (e.g., due to part thickness, thermal history, mold temperature and heat transfer rate, curative level, and various other factors), for each individual part, the degree of consistency in shape of the part's process curves and degree of clustering of such curves may be used to predict whether the resulting part will be appropriately formed and cured.

It is a further aspect of the present disclosure, that in various embodiments of the curing system and for certain moldable compounds, the corresponding shape of one or more of the above described process curves may exhibit a "maxima" and/or a "minima" at a given time which can also be used to infer useful information in monitoring, controlling and/or predicting the proper part cure time.

It is a further aspect of the present disclosure that in various embodiments and for certain moldable compounds, one or more (preferably a plurality) of "evaluators" (also referred to as "programmatic agents" or "conditions" herein) are provided for outputting values related to the cure time of a part. Such evaluators may be, e.g., the corresponding slope, or the integrated area under one or more of the process curves. The output from one or more of the evaluators can be correlated with known curing times of moldable compound samples to thereby determine a predictive effectiveness of the evaluator. The evaluators that exhibit a high degree of correlation to physically measured properties of the resulting parts may be used to infer useful information in monitoring, controlling and/or predicting the proper cure time of subsequently cured parts, such as parts that are mass produced. In at least one embodiment, the output from two or more (e.g., four) evaluators providing the highest degree of correlation with the measured curing properties are combined (e.g., as a linear combination) to yield an even better predictor for predicting part curing times.

It is a further aspect of the present curing system and method that embodiments thereof may include signal processing and other software and hardware components for both deriving process curves and corresponding characteristics of such curves (e.g., maxima and/or minima), as well as utilizing such curve characteristics to determine, in real-time, a more optimum cure time for in-mass parts produced. In particular, expert systems, artificial neural networks, and computational architectures that utilize, e.g., independent intelligent agents, and hybrid computational systems that provide a statistically based decision determination system such as CART by Salford Systems, 8880 Rio San Diego Dr., Ste. 1045, San Diego, Calif. 92108.

Moreover, it is an aspect of the present curing system and method that part cure times can be determined for achieving a desired property such as tensile strength, compression strength, dynamic stiffness, dimensional consistency, reduction and/or elimination of blisters/porosity, and adhesion to dissimilar material in the resulting cured part.

Further description of advantages, benefits and patentable aspects of the present disclosure will become evident from the accompanying drawings and description hereinbelow. All novel aspects of the disclosure, whether mentioned explicitly in this Summary section or not, are considered subject matter for patent protection either singly or in combination with other aspects of this disclosure. Accordingly, such novel aspects disclosed hereinbelow and/or in the drawings that may be omitted from, or less than fully described in, this Summary section are fully incorporated herein by reference into this Summary. In particular, all claims of the Claims section hereinbelow are fully incorporated by reference into this Summary section.

BRIEF DESCRIPTION OF THE FIGURES

FIG. 4 shows an electrical (impedance) sensor 17 provided in a mold 18.

DESCRIPTION OF THE PREFERRED EMBODIMENTS

Figure 1:
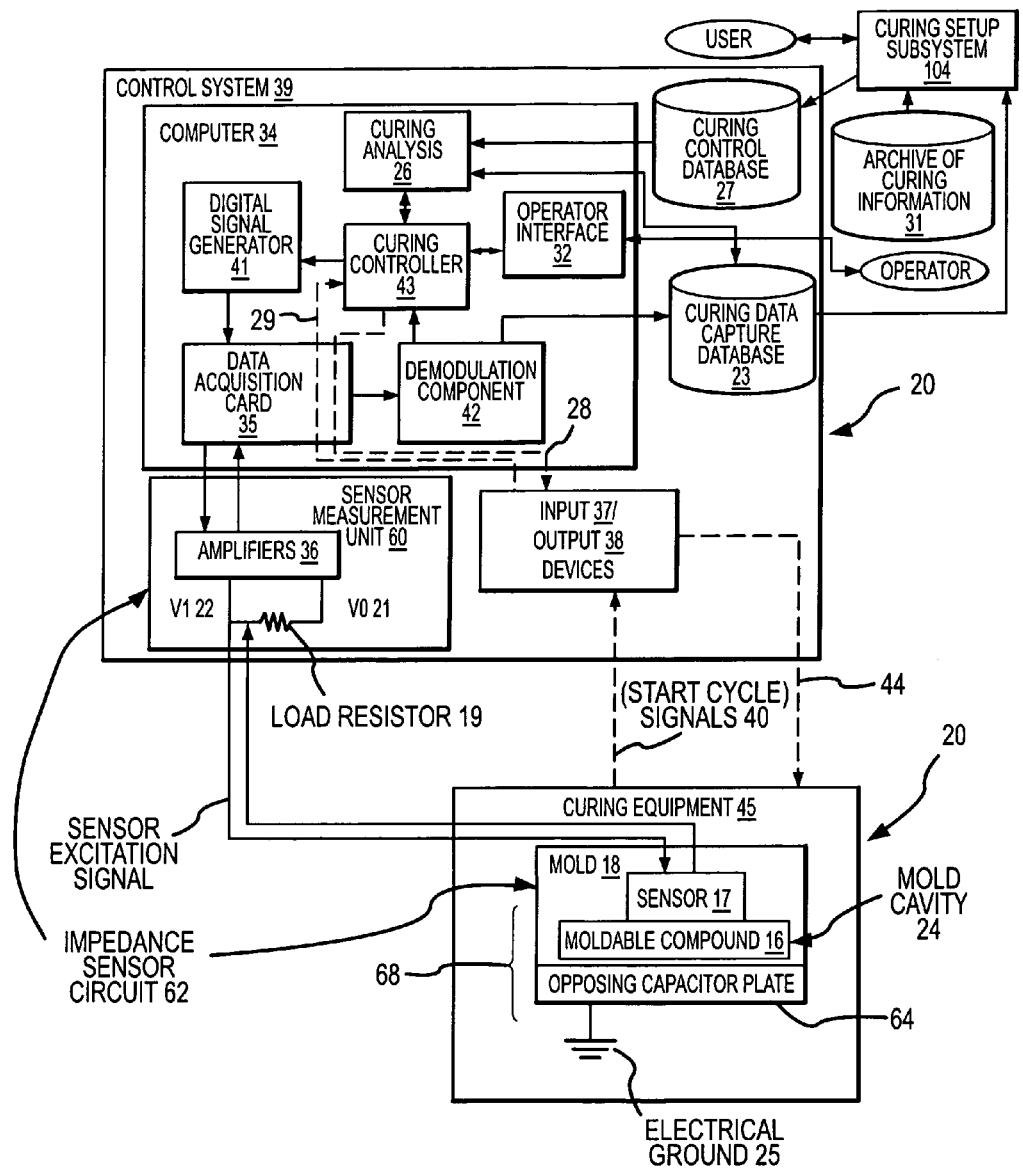
FIG. 1 shows the components of one an embodiment of the part curing method and system disclosed herein.

FIG. 1 illustrates an embodiment of the curing system 20 disclosed herein, wherein the curing system includes the following high level components:

(A) Curing equipment 45 for curing parts therein;
(B) A control system 39 for controlling the curing equipment 45 and adjusting curing parameters for reducing defects in parts cured in the mold 18; and
(C) A curing setup subsystem 104 for determining a collection of initial curing parameters for a particular part, and for determining adjustments that are available to correct curing conditions that are likely to generate defective parts.

The curing equipment 45 includes the following high level components:

(A.1) A mold 18 within which the moldable compound 16 is cured into a desired part, the mold having a mold cavity 24 for receiving a moldable compound 16 that is to be cured into a desired part. Within the body of the mold 18 there are a plurality of sensors 17 (only one is shown in FIG. 1) distributed for detecting impedance characteristics of various portions of the moldable compound 16 as it cures;

(A.2) Components for a plurality of capacitors 68 (only one of which is shown), wherein each capacitor 68 is formed from: (i) a corresponding one of the impedance sensors 17 placed directly adjacent to (and in general contacting) the moldable compound 16 being cured, and (ii) a grounded capacitor plate 64 which is in general another portion of the mold 18. Note that the moldable compound 16 is the capacitor dielectric for each such capacitor 68.

The control system 39 includes a computational system such as a computer 34 (or a network of computers) upon which the processing for controlling part curing is performed. In particular, the following components are provided by the computer 34 (or are capable of being accessed by the computer 34 via, e.g., a communications network such as the Internet or a local area network):

(B.1) A data acquisition card 35 for:
  (i) generating sinusoidal excitation voltages that are input to a sensor measurement unit 60, wherein the sensor measurement unit 60 provides such voltages to the sensors 17 for obtaining resulting signals indicative of impedance data streams from the sensors; and
  (ii) reading and digitizing the impedance signals output from each of the sensors 17 (and more particularly, from an amplifier 36 of FIG. 2, further described hereinbelow).

(B.2) A digital signal generator 41 for determining and outputting signal characteristics (e.g., frequency, and voltage), wherein such signal characteristics are used to control the signal output of the data acquisition card 35, and in particular, control the signal output to the sensor measurement unit 60.

(B.3) A digital signal demodulation component 42 for demodulating impedance indicative signals received, via the data acquisition card 35, from the sensors 17 and the amplifier(s) 36.

(B.4) A curing data capture database 23 for storing impedance data streams obtained from the sensors 17, and associating such data streams with information identifying the moldable compound 16 being used for part production, as well as, various environmental curing parameters (e.g., curing temperature, curing time, mold tonnage, etc.) for the part from which the impedance data streams were obtained.

(B.5) A curing analysis subsystem 26 for analyzing the output from a part currently curing (such output obtained from the curing data capture database 23), and determining any adjustments to the curing process that are likely to reduce a defect from forming in the part (e.g., adjusting the part curing time), or determining adjustments that can be used in curing subsequent instances of the part. Note that the curing analysis subsystem 26 may receive initial part curing parameters, and curing adjustment data (e.g., curing parameter adjustments during part curing, such as, mold 18 temperature adjustments, etc.) from a curing control database 27. Additionally, the curing analysis subsystem 26 may receive or derive data identifying particular characteristics of the impedance data streams, output by the sensors 17, for making adjustments to the part curing process, and/or identifying when the curing of a part is to be terminated. The flowchart of FIG. 8 and its accompanying description hereinbelow provide further disclosure of the actions performed by the curing analysis subsystem 26. Furthermore, the curing analysis subsystem 26 may include an expert system and/or "intelligent" system architectures for recognizing topographical (e.g., shape) features or mathematical properties of process curves, and/or patterns residing in the process curves. Thus, embodiments of the curing analysis subsystem may include one or more of: an expert system, one or more artificial neural networks, and a computational architecture that utilize, e.g., independent intelligent agents, fuzzy logic, and hybrid computational systems that provide a statistically based decision determination system such as CART by Salford Systems, 8880 Rio San Diego Dr., Ste. 1045, San Diego, Calif. 92108. Examples of graphical representations of impedance data streams are shown in FIGS. 9, 10, and 12 through 14.

(B.6) A curing controller 43 for controlling the curing of parts in the curing equipment 45. In particular, the controller 43 communicates with the curing analysis subsystem 26 for determining adjustments to the current curing of a part (e.g., curing time) and/or for identifying adjustments to used in curing subsequent parts in the same mold 18. In performing such adjustments, the controller 43 outputs curing commands or instructions to the curing equipment 45 via command line 28 to output device(s) 38. The device(s) 38, in turn, can translate (if necessary) such commands or instructions into corresponding commands or instructions that components of the curing equipment 45 can perform (e.g., a mold press, and a mold heating system), and then provide such translated commands or instructions to the curing equipment 45 via line 44. For example, such translated commands or instructions may be: (i) to increase the mold 18 curing temperature near a particular one of the sensors 17 on a subsequent part cured in the mold 18, (ii) to reduce the tonnage applied to the mold 18, (iii) to lengthen the curing time for the current part, and/or (iv) to open the mold 18.

(B.7) Digital input device(s) 37 for receiving (via line 40) indications of when a curing cycle has started, or when the moldable compound 16 is provided to the mold 18. The digital input device(s) 37 output corresponding notifications to the curing controller 43 via the line 29. Examples of such device(s) 37 are well known in the art.

(B.8) A sensor measurement unit 60 for generating electrical signals input to the sensors 17, and for receiving impedance indicative signals (i.e., impedance data streams) from the sensors 17. Note, there may unique sensor measurement unit 60 for each sensor 17.

(B.9) Amplifier(s) 36 (at least one per sensor measurement unit 60) for amplifying real-time (i.e., during part curing) impedance data signals corresponding to the impedance of the capacitors 68.

Regarding the curing setup subsystem 104, this subsystem is used by a curing user for interactively determining initial curing parameter settings for curing a subsequent series of parts in a particular mold 18, and in some embodiments, determining likely adjustments that can be made during the curing of these parts. The curing setup subsystem 104 may perform one or more of the following tasks:

(C.1) Allow the user to access an archive of curing information 31 (FIG. 1) for obtaining historical curing information related to the moldable compound 16 to be used in a current curing process, such information being, e.g.,
  (i) typical (and ranges of) curing temperatures for the moldable compound,
  (ii) typical (and variations of) curing process curves for the moldable compound 16, (iii) variations in curing temperature according to the composition of the moldable compound 16;

(C.2) Allow the user to access information on the curing equipment 45 to be used, e.g., a preferred temperature setting for curing equipment 45 may be typically 1 degree higher than another copy or model of the curing equipment 45;

(C.3) Allow the user to interact with the subsystem 104 to perform the steps FIGS. 6 and 7 described hereinbelow, wherein sample parts may be cured using different batches of the designated moldable compound 16, and cured using different curing parameters (e.g., cure time, mold temperature, tonnage, etc.) Alternatively, if there is sufficient historical curing information in the archive 31, then no sample parts may need to be produced and evaluated. In any case, the curing setup subsystem 104, outputs a collection of resulting initial curing parameter settings, (any) curing adjustments to be performed during the curing of a part (or subsequent adjustments for curing additional parts), and part curing termination conditions to the curing control database 27.

Data Acquisition and Control Hardware

The data acquisition and control hardware (e.g., digital signal generator 41, and the data acquisition card 35 of the embodiment of FIG. 1) may generate a plurality of sinusoidal signals of one or more desired frequencies, which are input (via one of the sensor measurement units 60) to each of the impedance sensors 17. In particular, if more than one signal frequency is input to each sensor 17, such signal frequencies are serially multiplexed into each sensor so that sensor impedance responses from each of the input frequencies (and for each sensor) can be obtained nearly simultaneously in comparison to a typical part curing time. The input one or more frequencies may be in a range of 10 Hz to 5 GHz, and corresponding conductance and/or capacitance measurements are determined from the sensor responses. Thus, the conductance and capacitance readings (equivalently, process curves) are specific to the moldable compound 16 under cure, in that the dipolar constituents of the compound will generate a pattern of dielectric responses specific to the moldable compound. Additionally, such conductance and capacitance readings are likely to be specific to the curing equipment 45 used.

Sensors 17

Figure 2:
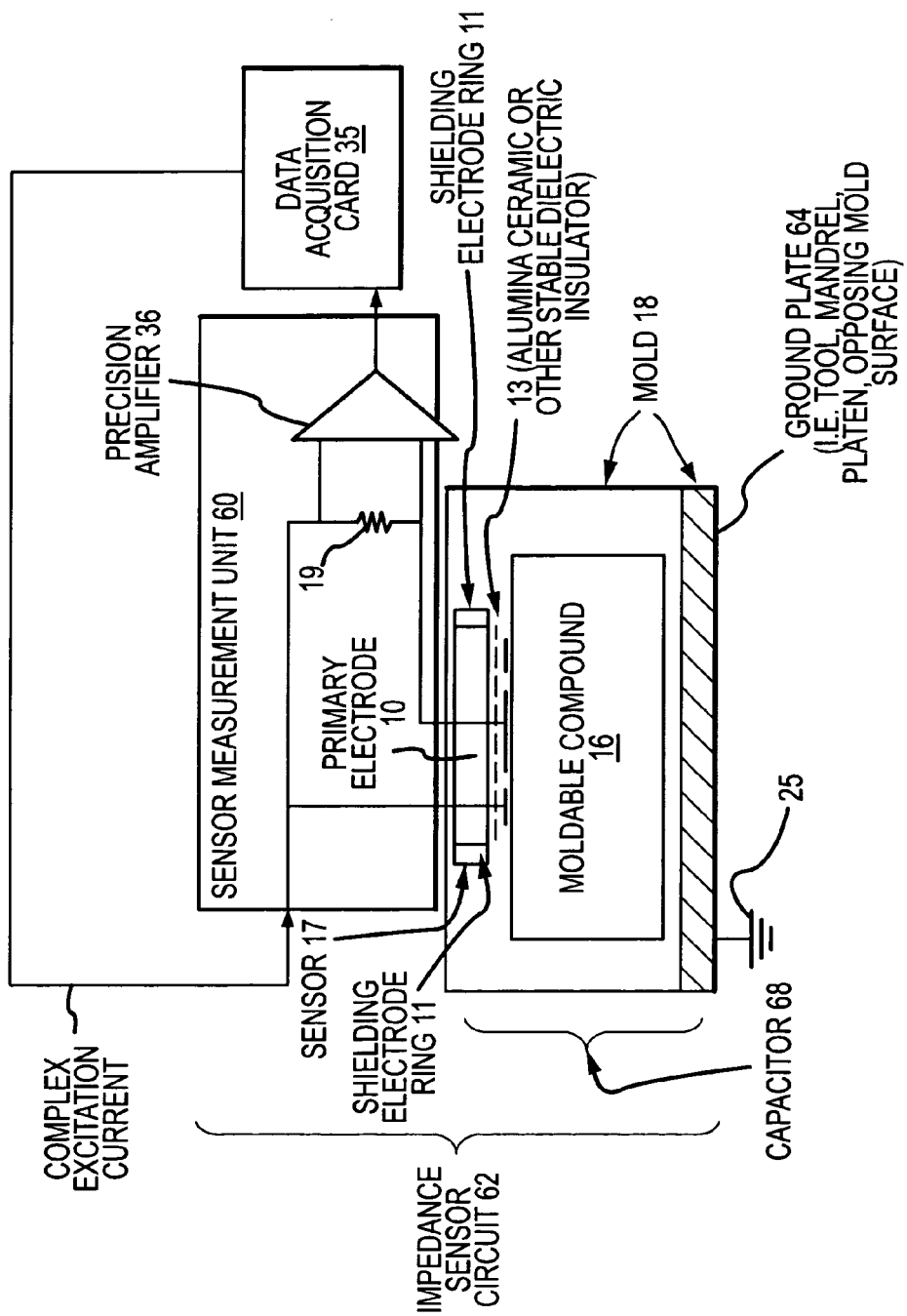
FIG. 2 shows a more detailed an embodiment of the impedance sensor circuit 62 that: (i) supplies electrical signals to the sensors 17, (ii) determines impedance measurements indicative of the impedance of the moldable compound 16 at or near the sensor 17.

An embodiment of one of the impedance sensors 17 is shown in greater detail in FIG. 2. In particular, each sensor 17 includes a primary electrode 10 that serves as a capacitor plate for the corresponding capacitor 68. An additional guard or shielding electrode 11 rings the primary electrode 10 and acts as a shield that precludes excessive fringing of the electrical field to the adjacent mold 18 surface in which each of the sensors 17 is typically flush mounted. The guard electrode 11, which is excited along with the electrode 10 (from signals received from the sensor measurement unit 60), helps to preclude the electrical field induced at the primary electrode 10 of the sensor 17 from fringing or becoming non-linear, as one skilled in the art will understand. The electrodes 10 and 11 are separated from the moldable compound 16 by a thin (e.g., approximately 0.001 to 0.05 inches) ceramic coating 13 (FIG. 2), such as, alumina ceramic or another stable dielectric insulator (e.g., dielectrically stable over the temperature range of the curing process such as, 300° F. to 425° F.). Both electrodes 10 and 11 may be composed of a low CTE metallic material, such as stainless steels, titanium, a nickel-cobalt-iron alloy called Kovar® (which is a trademark owned by CRS Holdings Inc., a subsidiary of Carpenter Technology Corp. of Wyomissing, Pa.), nickel steels, tool steels, tungsten, super alloys, and soft-magnetic alloys, etc embedded in a layered ceramic circuit (not shown). Any other planar or semi-planar conductive surface contacting the curing moldable compound (e.g., an opposing mold surface) can serve as the opposing plate (i.e., ground plate 64) of the capacitor 68 and acts as the third electrode for capacitively coupling with the primary electrode 10. Further note that the opposing plate 64 is grounded to electrical ground 25 to provide a common signal reference point. Thus, since the opposing plate is grounded, when a complex current (as described in the Definitions and Terms section) is driven through a resistor 19 (FIG. 2) to ground 25, this current passes through the moldable compound 16 which is the dielectric within the formed capacitor 68. The complex voltage across the resistor 19 is then measured with a high precision amplifier 36. The resulting signal is then input to the data acquisition card 35 and subsequently demodulated via the demodulation component 42 into the resulting signal's complex impedance components (e.g., conductance and capacitance).

Figure 3A:
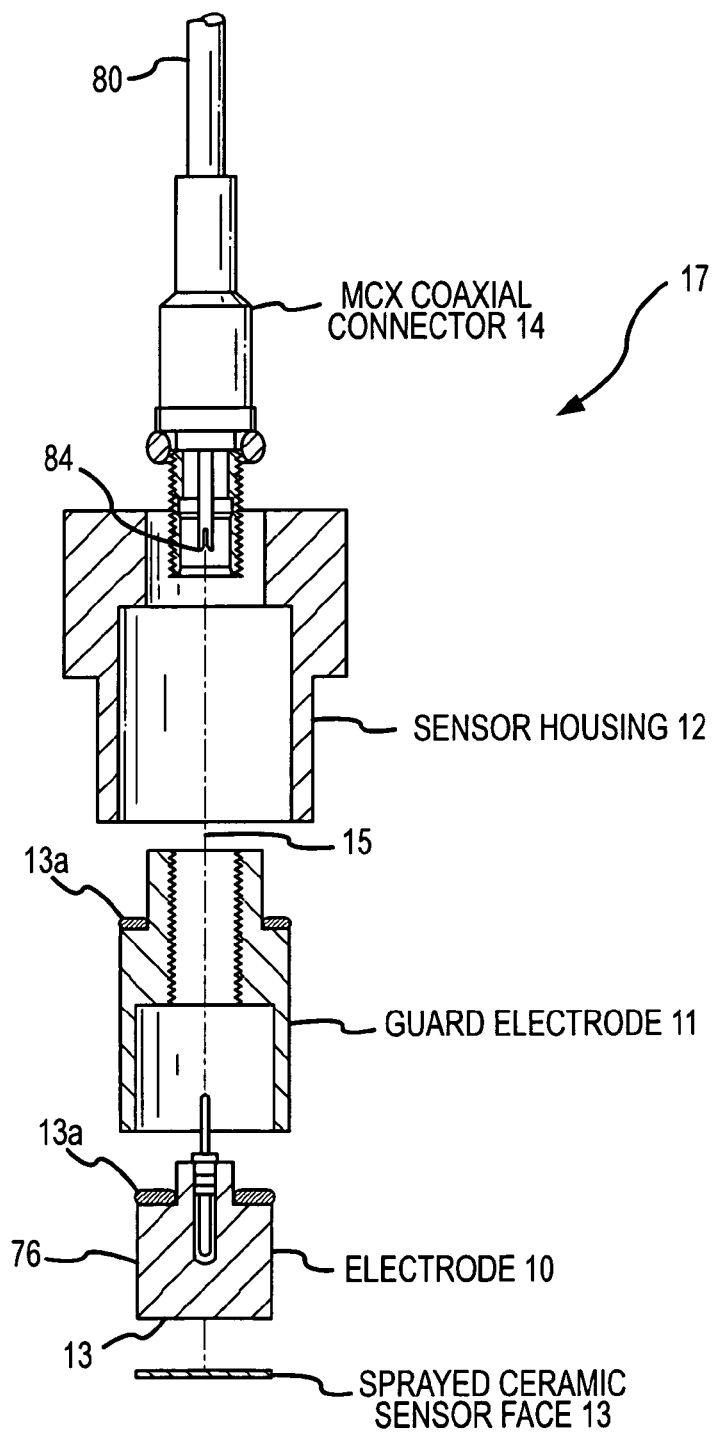
FIG. 3A shows an exploded view of one embodiment of one of the plurality of sensors that can be used for obtaining impedance measurements of the curing moldable compound 16.
Figure 3B:
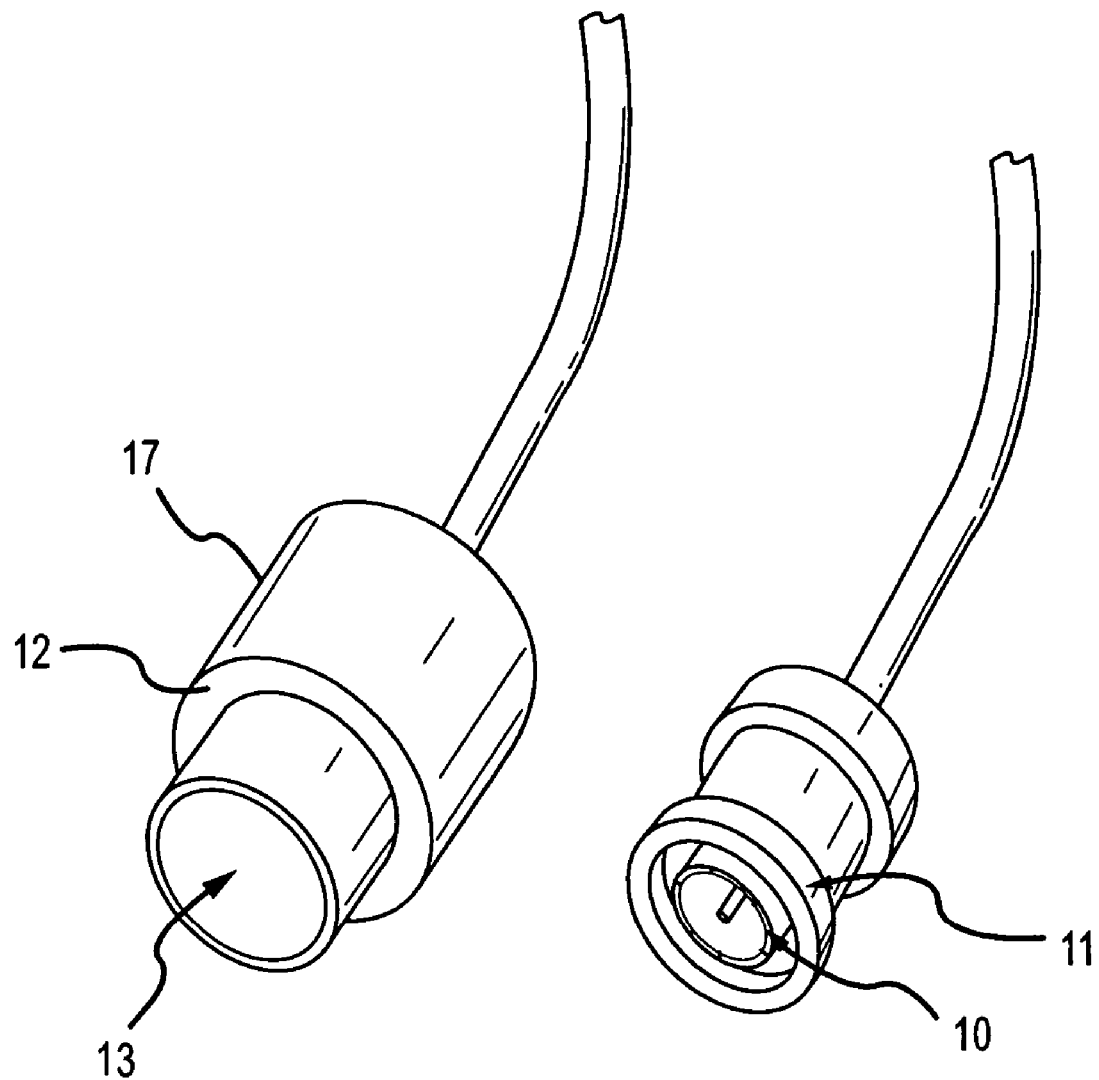
FIG. 3B shows additional views of the sensor 17 of FIG. 3A.

An embodiment of the sensor 17 is shown in FIG. 3A and FIG. 3B (wherein the rightmost portion of FIG. 3B has the sensor housing 12 removed). This embodiment includes a nested construction of A2 tool steel components, including a sensor housing 12, the primary electrode 10, and the guard electrode 11, wherein the electrodes are separated along the length of the electrode 10 (i.e., in the direction of axis 15) by a coating of cyanate ester potting material 76 and radially (from axis 15) by thin insulative ceramic coatings 13 and 13a, such as, alumina ceramic or other stable dielectric insulator. The ceramic coatings 13 and 13a may be applied with a thermal spray process (i.e. detonation gun, plasma, or high velocity ceramic (HVOF) spray process, as is well known to those skilled in the art). The ceramic coating 13 at the sensor face also: (a) transmits the compressive loads generated by the curing process to the sensor 17, and (b) separates the electrodes 10 and 11 from the moldable compound 16 being cured. A coaxial cable 80 is connected to the sensor 17 via an MCX connector 14 such as the MCX connector 14, part number 133-833-401 manufactured by Johnson's Components located at 299 Johnson Ave S.W., Suite 100, Waseca Minn. 56093 which is screwed into the guard electrode 11. The center conductor 84 mates with a pin machined integral with or press fit into the electrode 10. In some embodiments of the sensor 17, the primary electrode 10, the guard electrode 11, and the housing 12, along with an alumina ceramic face 13 may be fused together and separated electrically with glass or glass doped with alumina ceramic. Also, in some embodiments of the sensor 17 (e.g., FIGS. 3A and 3B), the primary electrode 10, the guard electrode 11, and the housing 12 may be coated with a 2 to 4 micron thick diamond or diamond-like material, such as Casidium as supplied by Anatech Ltd of Springfield, Va., and then press fit together such that the diamond or diamond-like coating provides electrical isolation between these three components (i.e., the electrodes 10, 11, and the housing 12), and also between the moldable compound 16 and the ceramic face 13 (FIG. 3A) of the sensor 17.

FIG. 4 shows how an embodiment of the sensor 17 may be positioned in the body of the mold 18 so that the ceramic face 13 faces the mold cavity 24 providing the shape and surface texture of the parts to be formed therein. In particular, the sensor 17 may be flush mounted in the mold 18 so that the sensor is in electrical contact with the part being molded from the moldable compound 16.

Since a plurality of sensors 17 may be provided in the mold 18, there will typically be at least one impedance data stream from each of the sensors 17.

Sensor Measurement Unit 60

Figure 5:
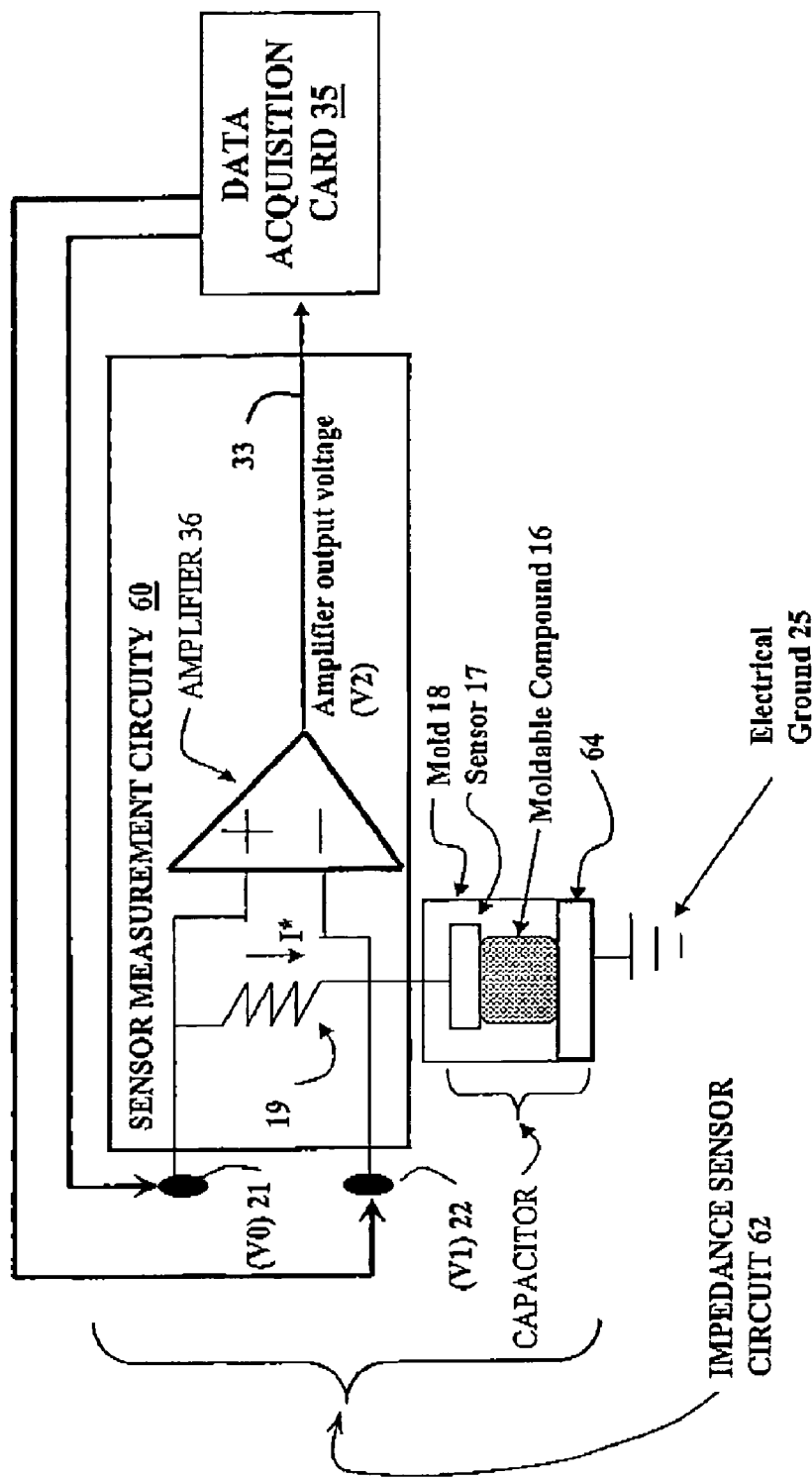
FIG. 5 shows another view of the impedance sensor circuit 62.

Each of the sensor measurement units 60 (FIGS. 1, 2, and 5) provides a non-bridged circuit that includes a simple voltage divider (FIG. 2) that, in turn, includes the resistor 19. Each of the sensor measurement units 60 is operatively connected to one of the plurality of capacitors 68 formed from one of the sensors 17 and the moldable compound 16, wherein the sensor measurement unit both provides the electrical current to each such capacitor, and detects impedance values resulting from the capacitor's response to the electrical signals. Note that the combination of the sensor measurement unit 60 and each capacitor 68 forms an impedance sensor circuit 62. The current provided to each impedance sensor circuit 62 is driven to a corresponding electrical ground 25 of the mold 18 (via an opposing capacitor plate 64 described hereinabove) through the curing moldable compound 16. For each sensor circuit 62, the load resistor 19 (typically, having approximately a 200 k-ohm resistance, although the range can be anywhere from 1 kOhm to several Mohms, e.g., 10 Mohms) is placed in line with the flow of current to the sensor 17 of the sensor circuit. The resultant voltage V2 on circuit line 33 (FIG. 5) output by the amplifier 36 measures the voltage across the resistor 19. By simultaneously measuring the applied voltage at position 21 (this applied voltage also known as the "excitation voltage", and also referred to as "V0"), the amount of attenuation and phase shift resultant from the flow of a complex current through the capacitor 68 is determined. FIG. 5 illustrates one instance of the sensor measurement circuit 60, where the applied (excitation) voltage at position 21 (e.g., V0=sin ωt) is placed at one terminal of the amplifier 36, and this potential drives a complex current I* through the load resistor 19 (R) and then finally through the corresponding capacitor 68 formed by the sensor 17, the moldable compound 16, and the electrical ground 25 attached to the mold 18.

The following description assumes a voltage amplitude of 1 volt for the excitation V0 at circuit position 21. However, all the subsequent analysis remains the same if the voltage is not unity, in that for the non-unity cases, the constant "k" in the equations below is defined as the ratio of the negative voltage (V1) at circuit position 22 to the positive voltage (V0) at circuit position 21.

The excitation voltage at position 21 (V0=sin ωt) drives a complex current (I*) through the resistor 19 to ground 25. In particular, the voltage V0 is a digitally generated sine wave generated by a high-speed data acquisition card 35, such as the PCI-MIO-16E4 card manufactured by National Instruments of Austin, Tex. The data acquisition card 35 produces high quality sinusoidal signals at frequencies varying from 10 Hz to 10 kHz as specified by, e.g., the operator or user. However, other data acquisition cards 35 may also be used for generating similar or different ranges of frequencies such as the PCI-MIO-16E1 data acquisition card manufactured by National Instruments of Austin, Tex. which can generate and monitor frequencies from 10 Hz to 1.25 MHz. An embodiment of the data acquisition card 35 may also provide simultaneous data sampling such as, a card specifically designed to carefully preserve interchannel phase relationships, e.g., the PCI-6110 card manufactured by National Instruments of Austin, Tex. is such a card.

Upon application of the excitation voltage V0 at circuit position 21, there is a voltage drop that occurs across the load resistor 19, leaving an attenuated and phase shifted signal at the circuit position 22 (i.e., V1=ksin(ωt +θ)=k<θ, where "<" is used to indicate a polar representation of a complex number and denotes the term "at a phase angle of"). The moldable compound 16 between the sensor 17 and electrical ground 25 provides a complex impedance of magnitude Z at phase angle Φ, wherein the phase angle Φ is a property of the curing moldable compound 16, and is not to be confused with the phase angle θ, which is defined as the phase angle difference between V0 and V1.

Calculating Z and Φ is done by simultaneously digitally capturing the excitation signal V0 (e.g., V0=sin(ωt)) and the amplifier 36 output voltage V2 on circuit line 33, where V2=sin(ωt)−ksin(ωt+θ). Alternately, in another embodiment, the same data could be obtained by capturing the sinusoids V0 ((sin(ωt)) and V1 (ksin(ωt+θ)) directly rather than capturing V2 (sin(ωt)−ksin(ωt+θ)). Note that the high-speed data acquisition card 35 can be used to digitize the signals V0 at position 21 and the signals V2 at position 22 thereby preserving the digital representation of the waveforms for further digital signal processing. Note that the values of Z and Φ obtained from the sensor measurement unit 60 as well as the various voltages (e.g., V0 and V2, or alternatively, V0, V1 and V2) from which the values of Z and Φ are derived will hereinbelow be referred to "impedance signal data".

Subsequently, once provided with the digitally preserved signals of V0 and V2, measurement of the quantities k (attenuation) and θ (phase shift) is done via standard demodulation practices, as is understood by one skilled in the art.

Once the quantities k and θ have been measured, determination of Z and Φ is done by analyzing the circuit described in FIG. 5 as follows.

i. I*=(V0−V1)/R
ii. Z=V1/I*
iii. Substituting, since V1=k<θ and V0=1
iv. Impedance (Z)*=R(k<θ)/(1−k<θ)=Z<Φ
v. As can be seen in the equation immediately above, the magnitude Z and phase angle are easily derived from the known values of R, k, and θ.
vi. Converting the polar number into a complex number separates out the real and imaginary components, series resistance and reactance.
vii. Series Reactance (Xs)=Z sin Φ=1/wC, where w=2πf
viii. Series Resistance (Rs)=Z cos Φ
ix. Series Capacitance (Cs)=1/wXs
x. Series Conductance (Gs)=1/Rs
xi. Rather than a series model, the impedance can also be modeled as a parallel combination of reactance (Xp) and resistance (Rp), as one skilled in the art will understand.
xii. Parallel Capacitance (Cp) can be calculated from the series reactance and resistance as follows: $C_P=-X_S/[w(R_S^2+X_S^2)]$
xiii. Parallel Resistance (Rp) can be calculated as follows: $R_P=-X_S/wC_PR_S$
xiv. Parallel Reactance (Xp) can be calculated as follows: $X_P=-1/wC$
xv. Parallel Conductance (Gp)=1/Rp.

In various embodiments of the curing system 20, any time series of data pairs: (Z and Φ), (Rp and Xp), (Gp and Cp), (Xs and Rs) or (Gs and Cs) can be used to represent the resultant cure data (also referred to as impedance data streams).

In the present disclosure, reference to capacitance (C), conductance (G), reactance (X) or resistance (R) is generally made irrespective of the type of circuitry model used (e.g., a series model, or a parallel model as described above). The impedance analysis performed by the curing system 20 is the same regardless of which circuitry model is used. That is, generic references to C, G, R, and X apply equally to either parallel or series data.

Moreover, it is also important to note that the part curing monitoring, controlling and adjusting capabilities of the curing system 20, in general, do not require the sensor measurement unit 60 to be a non-bridged circuit. In particular, the curing system 20 processing disclosed in FIGS. 6, 7 and 8, and described hereinbelow does not require such a non-bridged circuit. Instead the sensor measurement unit 60 may be a Wheatstone bridge or a substantially functionally equivalent thereto.

Process for Curing a Moldable Compound 16

Figure 6:
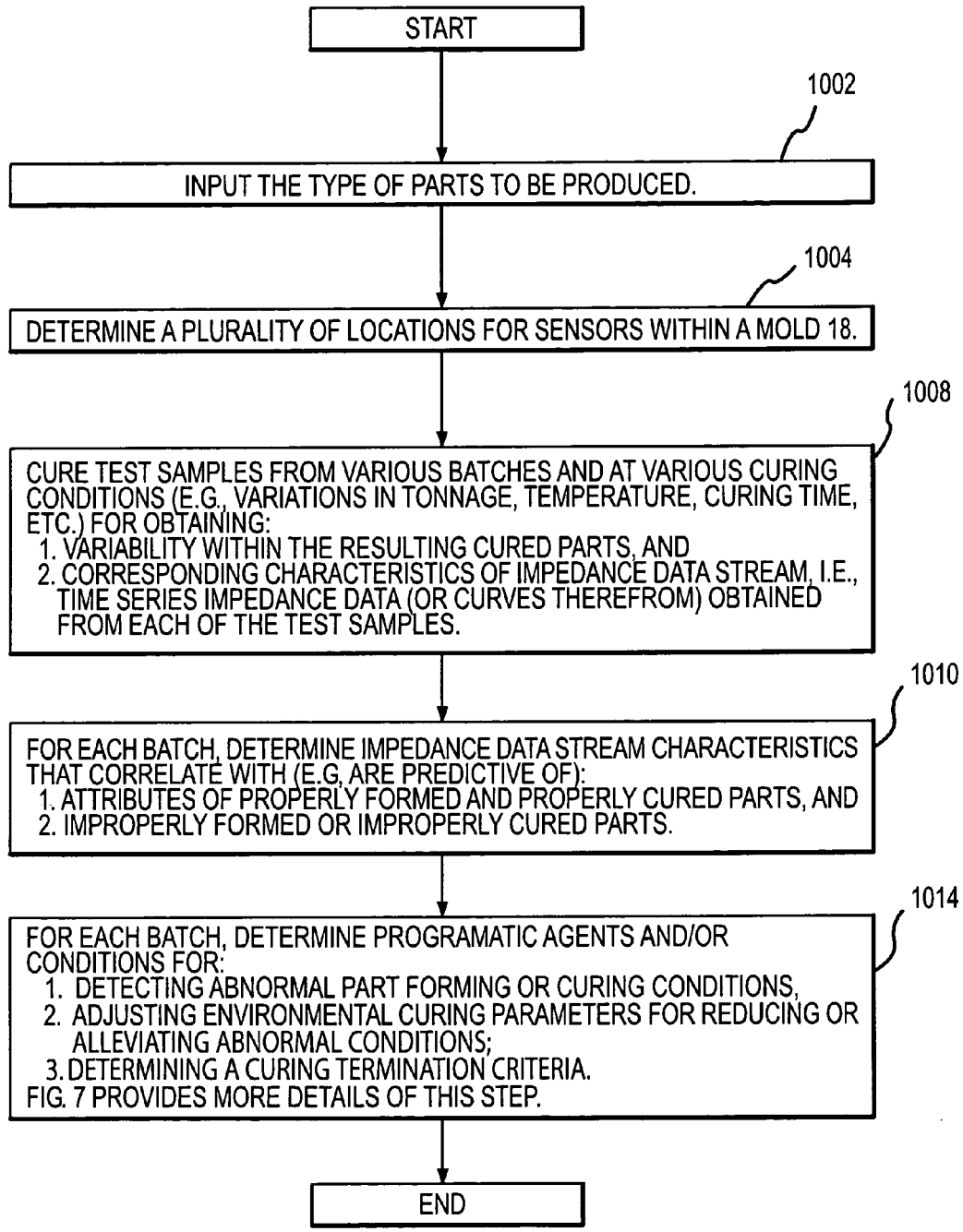
FIG. 6 is a flowchart of the high level steps performed for determining initial curing parameters for commencing the curing of a part, and for determining adjustments to curing parameters while curing a part and/or for use curing subsequent a part.
Figure 7:
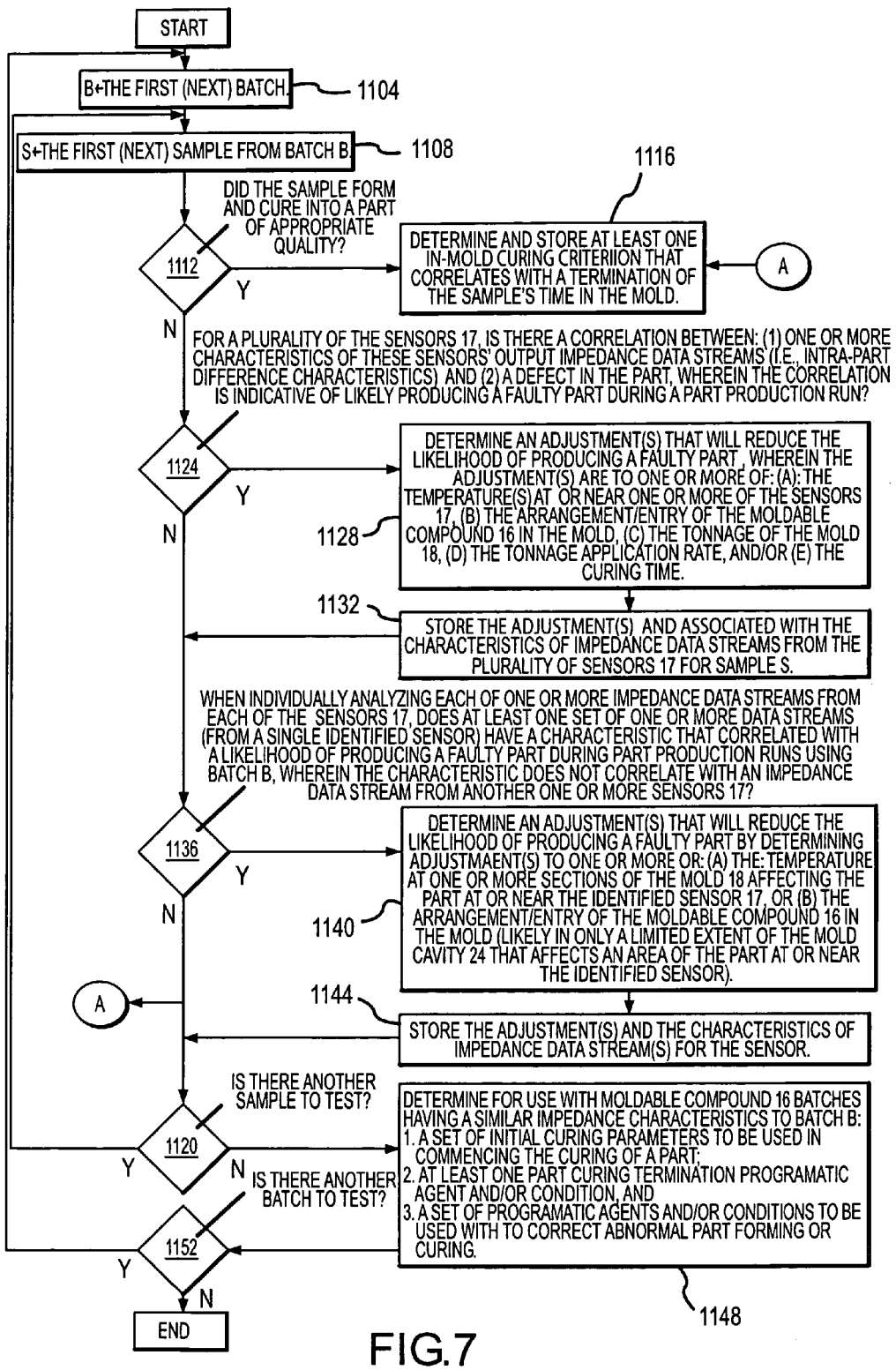
FIG. 7 is a flowchart providing more detailed steps for the step 1014 of the flowchart of FIG. 6.
Figure 8:
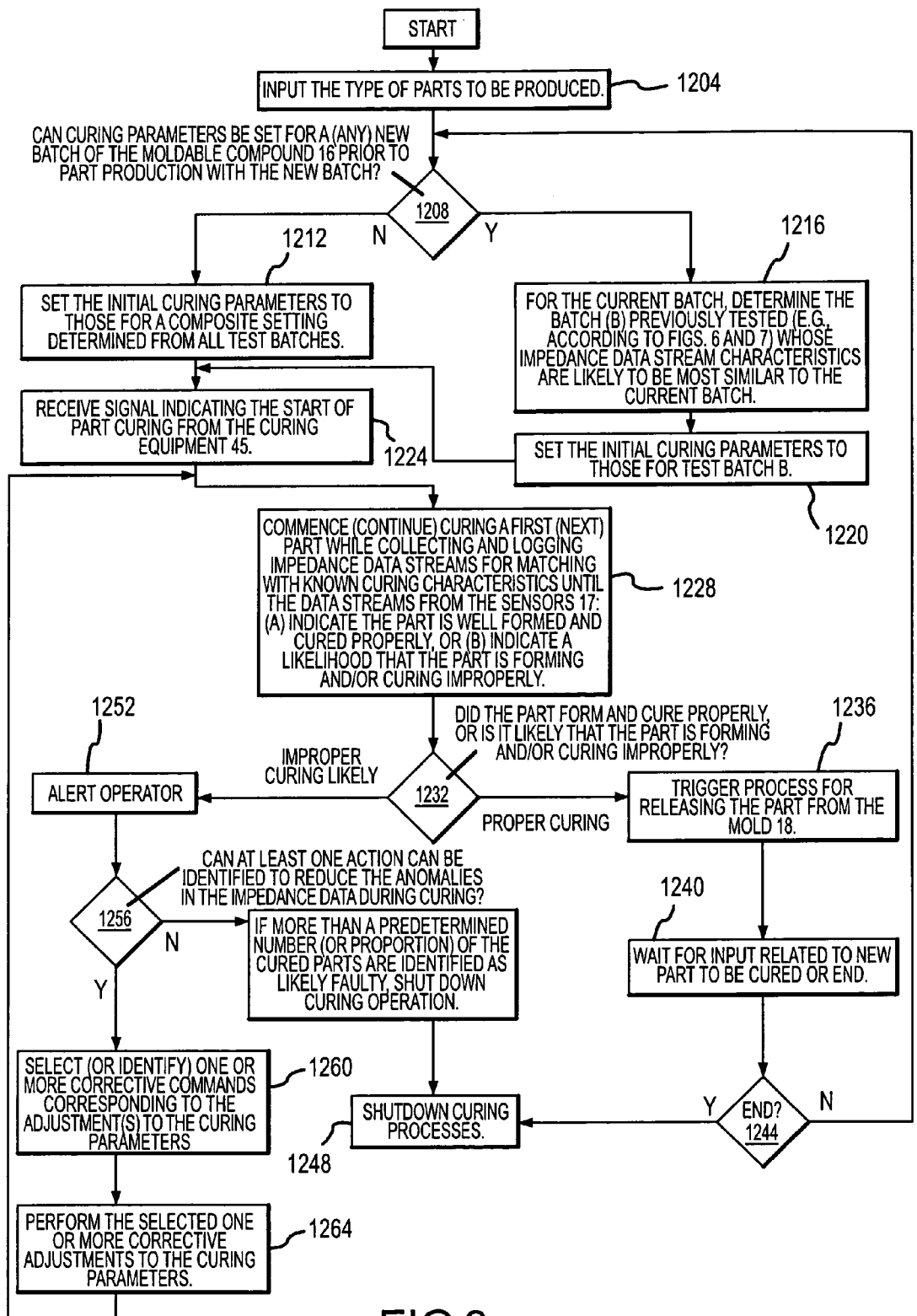
FIG. 8 is a flowchart showing an embodiment of the high level steps performed during, e.g., a production run, wherein a plurality of parts, that are expected to be substantially identical, are cured sequentially one after another.

The flowcharts of FIGS. 6, 7 and 8 illustrate the high level steps performed for curing a part wherein there are a plurality of sensors 17 distributed within the body of the mold 18 for determining the curing rates of various portions of parts formed within the mold. FIGS. 6 and 7 are flowcharts for determining, e.g., initial curing values in preparation for curing parts during production. In particular, FIGS. 6 and 7 may be considered as a technique for calibrating the part curing process for a given mold and type of moldable compound 16 to be provided to the mold. In step 1002, a user interacts with the curing setup subsystem 104 (FIG. 1) for inputting the type of parts to be produced from the curing equipment 45. Such input may include: (i) an identification of the moldable compound 16 to be provided in the mold 18, (ii) an identification of the part configuration (e.g., identification of the mold 18 to be used, locations of sensors 17 in the mold, identification of a part number for the parts to be produced, and/or a description of the parts to be produced, such as, part dimensions and/or shape). In one embodiment, such input may include electronic computer-aided design files providing a three-dimensional data model of the part to be cured and/or the mold cavity 24. Note that when such a three-dimensional data model is provided, it is possible to perform a moldable compound flow analysis for how the moldable compound flows in the mold 18. In step 1004, (if not provided in step 1002) a plurality locations are determined for providing sensors 17 (or other capacitance detectors) within the mold 18 such that such sensors can generate impedance data streams during part curing. Such locations are, in general, provided at a plurality of substantially distinct regions within the mold cavity 24. For example, such sensors 17 may be positioned in the mold 18 so that they are: (a) spaced apart at or adjacent to extreme ends of the mold cavity 24 (e.g., spaced apart at least ⅔ of the maximal dimension of the part), (b) placed at positions in the mold cavity 24 for obtaining impedance data for regions of the part that have substantially different thicknesses (e.g., capacitor 68 dialectic thicknesses differing by approximately 25% or more), (c) placed adjacent to substantial bends in the mold cavity 24 (e.g., bends of greater than 30 degrees), (d) placed at mold cavity 24 positions that are relatively remote from where the moldable compound 16 is initially introduced (e.g., placed, or enters) into the mold cavity 24 (e.g., a sensor 17 is positioned a distance of at least ⅔ of the maximal distance the moldable compound must flow, during curing, from where it is introduced into the mold cavity), and/or (e) placed at or adjacent to positions wherein the mold cavity 24 is a bottle neck for the flow of the moldable compound 16. In step 1008, a plurality of samples of the moldable compound 16 are cured in the mold 18 for forming test parts, wherein such samples are cured with various curing parameters for creating different curing environments. The test parts are then evaluated for determining part quality and the type and degree of part defects (if any). The variations in curing parameters may be as follows:

(a) Variations in mold 18 tonnage; e.g., such variations may be in a range of ±5% of an expected typical tonnage for properly forming and curing parts in the mold 18.

(b) Variations in mold 18 curing temperatures; e.g. such variations may be in a range of ±10% of an expected typical temperature for properly forming and curing parts in the mold 18. Note, however, the curing equipment 45 may be allow for different portions of the mold cavity 24 to have different temperatures. Accordingly, the samples may be cured with different temperature in different portions of the mold cavity 24. Note that not all theoretical combinations of temperature combinations need be considered in that it is typical that mold operators and others skilled in the art will have sufficient expertise to identify a relatively small number of curing temperature variations to be tested. For example, where the mold cavity 24 is relatively thin or narrow in a particular direction (e.g., less than 20% of the maximum mold cavity 24 dimension in the particular direction), the curing temperature may be tested in a range of from −15% of a particular predetermined curing temperature to +10% of this temperature. Alternatively, for relatively thick or wide portions of the mold cavity 24, the curing temperature may be tested in a range of from −5% of the particular predetermined curing temperature to +15% of this temperature. Additionally, when the moldable compound 16 is required to flow along a relatively extended flowpath to fully form the part, intermediate temperatures along one or more such flowpaths may be tested in a range of from −5% of the particular predetermined curing temperature to +15% of this temperature.

(c) Variations in curing times in the mold 18; e.g., such variations may be in a range of ±10% of an expected typical time for properly forming and curing parts in the mold 18.

(d) Variations in the rate at which tonnage is applied to the mold 18; e.g., such variations may be in a range of ±10% of an expected typical rate of tonnage application for properly forming and curing parts in the mold 18.

Note that the expected curing time may be determined by numerous techniques, including using one or a combination of the following: (i) curing operator expertise, (ii) curing data captured from the curing of similar parts (e.g., parts cured from the same or a similar moldable compound 16, in a mold cavity 24 of a similar shape and size, and cured using the same curing equipment 45 components, e.g., tonnage press, temperature sensors and regulators, etc.), (iii) computational simulations of the curing process, (iv) "intelligent" systems such as expert systems that have heuristic rules encoded therein, wherein such rules represent curing expertise domain knowledge, and/or (v) trial and error. Moreover, note that such an expected curing time may be adjusted or changed during step 1008 if, e.g., it becomes evident that the curing equipment 45 is curing parts substantially differently from past experience (e.g., one or more curing equipment components may be have been replaced thereby causing the curing equipment to behave differently from previous production runs of parts).

In addition to variations in the curing environment, variations in the moldable compound 16 may also be tested. For example, samples from different batches (as used herein the term "batch" denotes a quantity of the moldable compound 16 from which parts are to be produced, wherein the batch is assumed to be substantially uniform in its composition of the moldable compound) may be tested. In particular, batches may be tested different suppliers, produced at a different times, or produced using different facilities. Additionally, samples from batches having a known or unknown variation in composition may be tested.

Accordingly, for performing step 1008, a matrix of the possible combinations of environmental and moldable compound 16 variations ("batches") may be determined, and from such a matrix particular combinations may be selected for testing in this step. In one embodiment, the selection process may be automated by (i) computational simulations of the curing process, and/or (ii) "intelligent" systems such as expert systems that have heuristic rules encoded therein, wherein such rules represent curing expertise domain knowledge.

For each sample tested in step 1008, impedance data streams are obtained from the plurality of sensors 17 in the mold 18, and such data streams are stored for subsequent analysis as described hereinbelow.

In step 1010, for each batch of the moldable compound 16 tested in step 1008, the impedance data streams collected are statistically analyzed for determining one or more impedance data stream characteristics (e.g., slope values of the corresponding process curves at a particular portion of the curing cycle, or identifying when a local maximum or a local minimum is reached, etc.) that: (i) correlate effectively with features of properly formed and cured parts, and/or (ii) correlate effectively with undesirable features of malformed or defective parts. In particular, the following steps may be performed in such an analysis:
(a) determine the one or more impedance data stream characteristics (e.g., slopes) of the process curve(s) at one or more times during the part curing process (e.g., when the mold 18 is opened),
(b) if the desired part features(s) can be measured numerically (e.g., tensile strength), determine a statistical correlation (e.g., linear regression) between:
 (1) such impedance process curve characteristics, e.g., slopes at one or more times during the part curing process such as the time just before opening the mold 18, or the time at a transition between a first range of slope values and a second range of slope values), and
 (2) the measurements of the part feature(s) of the resulting part.
(c) assuming such correlations are statistically significant (e.g., $R^2 > 0.6$), such the impedance process curve characteristics may be used for determining whether the desired feature(s) are being obtained in subsequently produced parts (e.g., additional test parts).

For instance, if one of such desired part feature(s) has a pass/fail criteria associated with the part, and if the one or more characteristics (slope values) of the process curves can be grouped into a first group having a first (slope) range(s) indicative of the part passing, and a second group having a second (slope) range(s) indicative of the part failing, then the characteristics (slope values) for the process curves may be monitored throughout at least a portion of the part curing cycle for determining when (or if) the process curve slopes for each of the sensors 17 transition from the failing second (slope) range(s) to the passing first (slope) range(s). For example, assume that the only desired part feature is a fully formed part that is substantially non-porous, and there is an appropriately significant statistical correlation (linear or otherwise) for this desired feature occurring when the process curve slopes from all sensors 17 transition from a predetermined fail range to a predetermined pass range, within a predetermined maximum allotted part curing time. Accordingly, the curing controller 43 may output a signal (via line 28, FIG. 1) for the curing equipment 45 to open the mold 18 when either the maximum allotted time is passes (whereby the resulting part may be identified as defective), or the impedance data streams from all the sensors have slopes within the first range(s) (whereby the resulting part maybe identified as satisfactory).

Returning now to the steps of FIG. 6, and in particular to step 1014, once such correlations are determined, these correlations can be used to derive actions and/or conditions (e.g., embodied in programmatic agents, such as daemons, and/or executable expressions) that, in turn, can be accessed both prior to and during production part runs for monitoring and controlling the curing process. In particular, such programmatic agent and/or executable conditions may be:
 (i) for setting curing parameters at typical or "normal" values for the type of part to be produced (e.g., for the moldable compound 16 to used, and for the desired features in the resulting cured parts);
 (ii) for evaluating part forming and curing while the part is in its mold 18, as well as adjusting curing parameters (when undesirable characteristics of the impedance data stream(s) are detected) so that the part is more likely to be free of defects; and
 (iii) for determining part curing termination.

Such conditions and/or actions (e.g., their stored programmatic agents and/or conditions) can be accessed for monitoring and/or affecting subsequent part curing processes as is described hereinbelow. Moreover, such programmatic agents and/or conditions may be closed form equations (e.g., linear regression equations), iterative procedures, or "IF THEN" rules such as may be instantiated in an expert system rule base. In some embodiments, such agents may be implemented as daemons as one skilled in the art will understand.

A more detailed description of an embodiment of step 1014 is shown in FIG. 7. In step 1104 of this figure, information identifying the first batch having samples that were tested, as in step 1008 of FIG. 6, is determined (such information denoted herein as "B"). Then in step 1108, information identifying the first sample tested from the batch B is determined (such sample identifying information denoted herein as "S"). In step 1112, a determination is made as to whether the sample S formed and cured into a part of appropriate quality. If so, then (step 1116) at least one in-mold curing condition is determined that correlates with the termination of the sample S being in its mold 18. Note that a typical cure termination condition for an appropriately cured part is an extended portion of substantially zero slope (e.g., in a range of −0.1 to +0.1) near the end of the part cure cycle for the process curves of each of the sensors 17, e.g., such extended portions enduring for at least about 5 to 10% of the expected curing time. Subsequently, in step 1120, a determination is made as to whether there is another sample from batch B to inspect. If another such sample was tested then perform step 1108 again to obtain (as S) information identifying the next sample of the batch B.

If, instead, it is determined in the performance of step 1112 that the sample did not produce a part of appropriate quality, then in step 1124 a determination is made as to whether there is a correlation between characteristics of the impedance data streams for the plurality of sensors 17, and at least one defect in the part. There are various techniques that may be used to perform this determination. In one technique, the resulting sample part and the corresponding plurality of impedance data streams (or their corresponding process curves) are manually inspected by persons skilled in the curing art for identifying such correlations. In particular, an impedance related characteristic for a group of two or more of the sensors 17 may vary enough so that it is identified manually. In another technique, the detection and correlation of part defects with variations between process curves may be identified statistically by the curing setup subsystem 104. For example, each test part may be evaluated and identified as one or more of: (i) a non-defective part, (ii) a defective part having voids, (iii) a defective porous part, (iv) an under cured part, (v) an over cured part, (vi) a non-well formed part, and/or (vii) a defective part due to not having a desired property, e.g., a desired range in one of: tensile strength, compression strength, dynamic stiffness, dimensional consistency. Subsequently, for each identification of the identifications (ii) through (vii), each test part having the identification may have its process curves evaluated to determine anomalous characteristics that are not present in the parts identified as non-defective. In particular, for each identified defect type, and for each test part having this defect type, differences or variations between the process curves (from different sensors 17) for the part may be determined (such characteristics referred to as "intra-part difference characteristics"). For instance, such intra-part difference characteristics may be one or more of: (1) differences in process curve slopes within a particular time range in the curing process (e.g., the last third of the curing time), (2) differences in process curve maximum and/or minimum values, and (3) differences in curing time values for corresponding process curve characteristics (e.g., differences in maximum and/or minimum values between process curves for different sensors 17, etc.). Subsequently, for each part defect type, one or a combination of such intra-part difference characteristics may sufficiently correlate with the part defect type so that the intra-part difference characteristics can be used to: (i) change the part curing environment prior to a part production run, and thereby diminish the part defect type during production, and/or (ii) change a curing parameter during the curing of a part where the intra-part difference characteristics are occurring (e.g., shorten or lengthen the in-mold time for curing the part). Examples of such variations between impedance data streams (or their process curves) for different sensors 17 that correspond or associated with part defects are shown in TABLE A following.

TABLE A

| ANOMALOUS INTRA-PART VARIATION BETWEEN IMPEDANCE DATA FROM DIFFERENT SENSORS | LIKELY ASSOCIATED PART DEFECT |
|---|---|
| The process curves of two or more sensors 17 are similar in shape, but are offset in curing time from one another an excessive amount, e.g., at least 10% of the total expected curing time; e.g., for each impedance value $Z_0$ of one of the process curves for a sensor $P_0$, there is a corresponding impedance value $Z_i$ for each of the other sensors $P_i$ wherein $Z_i$ is both within a range of 1% of the maximum variation in the expected impedance values from the value $Z_0$, and occurs within 1 second of $Z_0$. | |
| The process curves of two or more sensors 17 are similar in shape, but are offset in impedance magnitude from one to another an excessive amount, e.g., the maximum value of one process curve is at least 50% greater than the maximum value of the other process curve. | Voids in the part. |
| For two or more sensors 17, the maximum slopes of their corresponding process curves between the start of the cure and their maximum values differ by more than 25%. | Voids in the part. |
| For two or more sensors 17, the maximum slopes differ by more than 25%, wherein for each of the process curves, each maximum slope is the maximum between the maximum value of the process curve and the point of maximum rate of change of the process curve. | Localized areas of the part may be undercured, e.g., the part may be porous, i.e., the part has a portion wherein there is gas trapped within a large plurality of small pores (bubbles) in the part portion. Alternatively/additionally, the part may form blisters, i.e., a local swelling or raised bubble on the part surface that forms after part de-molding. |

In another embodiment for determining (in step 1124) whether there is a correlation between characteristics of the impedance data streams for the plurality of sensors 17, and at least one defect in the part, the intra-part difference characteristics may be compared with previously obtained intra-part difference characteristics from a different collection of sample tests (and/or part production runs) wherein the resulting sample parts were molded from a similar moldable compound 16, and such resulting parts were of a similar shape and size. In particular, embodiments of the curing method and system disclosed herein may collect, over time, a large repository of impedance stream data and/or intra-part difference characteristics. For instance, for each of a plurality of different types of parts previously produced (e.g., via previous sample tests and/or part production runs), collections of impedance data streams and/or intra-part difference characteristics for each part produced may be archived together with associated information such as:

(i) part type features (e.g., moldable compound 16 used, possibly including compound consistency or variation in composition, part shape, variation in part dimensions, maximum and minimum part extents, and other indications of part size and/or volume), (ii) the number and relative positions of the plurality of sensors 17 used in obtaining the impedance data streams (e.g., the maximum distance around any sensor that does not include another sensor, the maximum distance between any two sensors, and/or an indication of whether the sensors were appropriately positioned in the mold to effectively assess part curing conditions), (iii) the curing parameters used for curing the part (e.g., curing temperature(s) at each sensor, tonnage applied during part curing, tonnage rate applied, the curing in-mold time, curing equipment 45 used, the mold 18 heat transfer rate, etc.), and (iv) resulting part features (e.g., part defects detected, part strength characteristics, part elastomeric characteristics, heat conductance of the part, etc.).

Thus, statistical and intelligent processes may be used to compare features of a new part to be produced with previously produced parts having similar features not only for identifying possible impedance data stream characteristics that may correlate with various kinds of potential part defects, but also for providing assistance in appropriately positioning the sensors 17 within the mold 18.

In yet another technique for determining (in step 1124) whether there is a correlation between intra-part difference characteristics of the impedance data streams, and at least one defect in the part, computational simulations or models may be performed to determine if simulated versions of impedance data streams and the corresponding intra-part difference characteristics would likely be associated with the part defect actually obtained from the sample S.

If a sufficiently predictive correlation (e.g., at least approximately $R^2>0.6$) is determined in step 1124 with at least one part defect, then in step 1128, one or more curing process adjustments are determined that will reduce the likelihood of producing this defect. Such actions may be determined by personnel skilled in the art of curing, by statistical analysis, and/or by simulating or modeling how certain actions are likely to affect the part forming and curing process. Subsequently, in step 1132, an encoding of the determined adjustment(s) is associated with the impedance data streams for the sample S, and stored. Note that also associated and stored therewith are identifications of the moldable compound 16 and its batch identification. Of course, if there are additional such correlations between: (i) one or more additional intra-part difference characteristics, and (ii) some defect in the part, then steps 1124 through 1132 may be iterated until no further such correlations are detected.

Regardless of the outcome from step 1124, step 1136 is performed wherein a determination is made as to whether there is a single sensor 17 (the "identified sensor" hereinbelow) whose impedance data stream(s) has at least one characteristic that effectively correlates with a likelihood of producing a defect in the part, wherein this correlation is substantially limited to only the output from this single sensor (i.e., the correlation detected here would not have been detected in step 1124). If a correlation is identified in step 1136, then (in step 1140) one or more curing process adjustments are determined that are intended to reduce the likelihood of the defect occurring, wherein such adjustments preferably affect substantially only a limited extent of the curing part that is near the identified sensor 17 (e.g., such affects are preferably limited to a part extent that does not substantially change the curing parameters at any other sensor 17). An example, of such limited affects is the changing of the mold cavity 24 temperature only in a region including the identified sensor 17. Another example of such limited affects may occur in the case where the moldable compound 16 is injected into the mold 18 near the identified sensor 17 providing anomalous impedance data; i.e., an increase in injection pressure at or near the identified sensor 17 may be provided.

Subsequently, in step 1144, an encoding of the adjustment (s), determined in step 1040, is associated with the impedance data streams from the sample S, and stored. Note that also associated and stored therewith are identifications of the moldable compound 16 and its batch identification. Of course, if there are additional such correlations (for the sample S) between: (i) the impedance data stream(s) from another identified one of the sensors 17, and (ii) a defect in the part, then steps 1136 through 1144 may be iterated until no further such correlations are detected.

Following step 1144, step 1120 is encountered for determining whether there is another sample from the current batch B to analyze. A positive result from this step will cause step 1108 to be performed again. However, if there are no further samples from the batch B, then in step 1148 the following are determined:

(i) a set of initial curing parameters to be used in commencing the curing of a part from a moldable compound 16 having impedance characteristics similar (or identical to) those of the samples from batch B;

(ii) at least one part curing termination programmatic agent and/or condition (e.g., such an agent or condition may be "after curing at 340 degrees for 4 minutes, open the mold 18"); and (iii) a set of one or more programmatic agents and/or conditions for correcting abnormal impedance measurements obtained form a part curing in the mold 18 (e.g., lengthen or shorten the in-mold curing time).

Step 1148 may be considered as a step of combining or synthesizing the results obtained from steps 1128 and 1140 so that such adjustments and curing terminating criteria are based on a plurality of samples from the batch B. Note, however, that in an alternative embodiment, steps 1128 and 1140 may merely identify anomalous impedance values (or process curve characteristics), and not determine curing parameter adjustments. In this later embodiment, step 1148 determines curing parameter settings; e.g., by, first classifying each of the anomalous impedance data stream characteristics, wherein each class identifies a single anomalous curing condition, then (i) determining a set of one or more composite process curves for each such class, and then (ii) determining the initial curing parameters, as well as the one or more programmatic agents and/or conditions (e.g., predetermined curing temperature variations, or predetermined variations in curing time) for terminating or adjusting part curing using the composite process curves. Note that the following are representative examples of the programmatic agents and/or conditions that may be determined and subsequently used by the curing analysis subsystem 26 to evaluate the impedance data streams (or process curves) from the plurality of sensors 17:

(a) For each of one or more predefined segments of a process curve, determine the maximum impedance value;

(b) For each segment of one or more predefined segments of a process curve, determine the time of the maximum impedance value;

(d) For each segment of one or more predefined segments of a process curve, determine the minimum impedance value;

(e) For each segment of one or more predefined segments of a process curve, determine the time of the minimum impedance value; and (f) For each segment of one or more predefined segments of a process curve, determine, the integrated area under the graph of the segment impedance values vs. time.

Note, however, that other impedance related measurements are also contemplated for use in various embodiments of the curing method and system disclosed herein, such as: (1) curing times and/or impedance values for one or more process curve points identified by various derivative conditions (e.g., inflection points, etc.), (2) one or more coefficients of a polynomial fit to a segment of an impedance data stream, (3) a centroid (or a coordinate thereof) of an area under a graph of a segment of a process curve, and/or (4) one or more coefficients of a higher order derivative of a process curve fit to a segment of an impedance data stream. Additionally, it is within the scope of the curing method and system disclosed herein to also include programmatic agents and/or conditions that are not as easily described geometrically, such as a predicted cure time output by an artificial neural network, a fuzzy logic system, or a heuristically based evaluator.

Subsequently, in step 1152, a determination is made as to whether there is another batch from which samples were tested, and from which their corresponding impedance data streams (or process curves) have been inspected for a correlation(s) with part defects. If there are additional such batches, then step 1104 and subsequent steps are again performed. However, if there are no such additional batches, then the flowchart of FIG. 7 ends.

Note that in performing the steps of FIG. 7, if the samples moldable compound 16 were not distinguished by batches, then all samples can be considered to be from a single batch. Accordingly, the result of the single performance of step 1148 is a composite collection of curing parameters that will be used for each part made from the curing equipment 45, and the moldable compound 16.

For the moldable compounds 16 disclosed herein, the following table shows representative examples of various impedance data stream (or process curve) characteristics that may be determined as indicative of and/or correlate with particular part features, and when such characteristics are indicative of an action (e.g., termination of the curing of the part, or a defective part being formed), the rightmost column indicates what actions are to be performed for: (i) adjusting and continuing the curing of the current part, (ii) terminating the curing of the current part, and/or (iii) identifying adjustments that are be made to the initial curing parameters for a subsequent part.

TABLE B

| IMPEDANCE DATA STREAM/ PROCESS CURVE CHARACTERISTICS AND DETERMINATIONS THEREOF | LIKELY CAUSE FOR THE CURVE CHARACTERISTIC | RESULTING PART FEATURE OR PART PRODUCTION FEATURE | ADJUSTMENTS OR CURING TERMINATION |
|---|---|---|---|
| An extended "flat" portion detected for each of the process curves, e.g., a flat portion that extends for at least about 5 to 10% of the expected curing time); such a flat portion may be determined by generating a best fit $3^{rd}$ order polynomial (or more generally, a best fit $n^{th}$ order polynomial, $n \geq 3$) that models the impedance data for the last 20 seconds of the cure, and the $1^{st}$ derivative of this polynomial (i.e., the slope) yields a substantially zero slope (e.g., in a range of −0.1 to +0.1), near the end of the cure cycle. | Material has cured. | Fully cured part. | Terminate cure of part. |
| An unexpectedly extended "flat" portion of one of the process curves (e.g., a flat portion extending at least about 5% of the expected part cure time); such a flat portion may be determined by generating a best fit $3^{rd}$ order polynomial (or more generally, a best fit $n^{th}$ order polynomial, $n \geq 3$) that models the impedance data for about the first 20 seconds of the cure, and the $1^{st}$ derivative of the generated polynomial (i.e., the slope) yields a substantially zero slope (e.g., in a range of −0.1 to +0.1. | Moldable compound 16 is flowing after full tonnage. | Voids in the part. | Increase tonnage, and/or increase the amount of time at "full tonnage" before starting the cure timer, and/or for subsequent parts, reduce mold closure speed. |
| A process curve's impedance value does not increase at least 10% from a value at the initiation of curing, and then decrease (i.e., does not rise to a peak value) before the derivative of the best fit $3^{rd}$ order polynomial (or more generally, a best fit $n^{th}$ order polynomial, $n \geq 3$) of the last 20 seconds of impedance data reaches a substantially zero slope (e.g., in a range of −0.1 to +0.1). | Moldable compound is not entering a gelation phase near at least one of the sensors 17. | Voids in the part | Increase tonnage or injection pressure, and/or reduce mold temperature, and/or (if possible, or for subsequent parts) add cure inhibitors to the moldable compound 16. If process curve characteristics persist, then terminate part cure. |

TABLE B-continued

| IMPEDANCE DATA STREAM/ PROCESS CURVE CHARACTERISTICS AND DETERMINATIONS THEREOF | LIKELY CAUSE FOR THE CURVE CHARACTERISTIC | RESULTING PART FEATURE OR PART PRODUCTION FEATURE | ADJUSTMENTS OR CURING TERMINATION |
|---|---|---|---|
| Fluctuations in at least one of the process curves within what is expected to be the first third of the part curing time, wherein such fluctuations in the process curve yields a plurality of pairs of a local maximum followed by a local minimum, each pair having a difference between its members of at least 5% of the maximum variation in the process curve (or corresponding impedance data stream). E.g., the mean squared error between the impedance data and a best fit $3^{rd}$ order polynomial (or more generally, a best fit $n^{th}$ order polynomial, $n \geq 3$) of the last 20 seconds of impedance data is greater than a predetermined impedance value. | Moldable compound 16 is flowing after full tonnage | Voids in the part. | Increase tonnage, and/or increase the amount of time at "full tonnage" before starting the cure timer., and/or for subsequent parts, reduce mold closure speed. |
| Fluctuations in at least one of the process curves within what is expected to be the last third of the part curing time (such fluctuations being, e.g., as decribed above). E.g., the mean squared error between the impedance data and a best fit $3^{rd}$ order polynomial (or more generally, a best fit $n^{th}$ order polynomial, $n \geq 3$) of the last 20 seconds of impedance data is greater than a predetermined impedance value. | Buildup of gas byproducts in the mold cavity 24. | Porosity and/or voids in the part. | Release gas byproducts from the mold cavity 24 by increased venting, burping (e.g., bumping) the mold 18. |
| An extended "flat" portion of one of the process curves near its peak (e.g., a flat portion that extends for at least about 5% of the expected curing time); such a flat portion may be determined by generating a best fit $3^{rd}$ order polynomial (or more generally, a best fit $n^{th}$ order polynomial, $n \geq 3$) that models approximately 20 seconds of impedance data that is centered around the peak, and then determining that the $1^{st}$ derivative of this polynomial (i.e., the slope) yields a substantially zero slope (e.g., in a range of −0.1 to +0.1), for greater than, e.g., 5 seconds of the process curve.. | Too many inhibitors added to the moldable compound 16. | Increased cure time before demolding part | Increase mold 18 temperature (at at least the portion of the mold cavity 24 at or near the sensor 17 providing the process curve having the extended "flat" portion, and/or (if possible, or for subsequent parts) reduce curing inhibitors in the moldable compound 16. |
| At least one process curve from one of the sensors 17 has flattened according to, e.g., a best fit $3^{rd}$ order polynomial (or more generally, a best fit $n^{th}$ order polynomial, $n \geq 3$) is generated that models the last 20 seconds of impedance data, and the $1^{st}$ derivative of the polynomial (i.e., the slope) measures a substantially zero slope (e.g. in a range of −0.1 to 0.1) for at least 15 seconds, and a process curve from at least one other sensor 17 (or more precisely, the generated $n^{th}$ order polynomial) has not reached a substantially zero slope. | Different areas on the part are completing their curing at different times. | Increased cure time before demolding part, and/or voids in the part having at higher mold temperatures. | Increase temperature in localized areas, and/or (if possible, or for subsequent parts) change how the moldable compound 16 is introduced into the mold cavity 24. |
| At least one process curve from one of the sensors 17 $s_1$ has flattened out for at least 15 seconds, and a process curve from at least one other sensor 17 $s_2$ has not flattened out (i.e., the expected cure time is within the last ⅓ to ¼ of the time, and the process curve | Gelation is not occurring substantially simultaneously throughout the part. | Increased cure time before demolding part (e.g., increase in-mold time until all process curves flatten out), and/or voids in the part having at higher mold temperatures | Increase temperature in localized areas, and/or (if possible, or for subsequent parts) change the introduction of the moldable compound 16 into the mold cavity 24. |

TABLE B-continued

| IMPEDANCE DATA STREAM/ PROCESS CURVE CHARACTERISTICS AND DETERMINATIONS THEREOF | LIKELY CAUSE FOR THE CURVE CHARACTERISTIC | RESULTING PART FEATURE OR PART PRODUCTION FEATURE | ADJUSTMENTS OR CURING TERMINATION |
|---|---|---|---|
| from $s_1$ has obtained a slope in the range of −0.1 to +0.1 at least 15 seconds before the process curve for $s_2$ similarly flattens out. | | | |

Examples of at least some of the correspondences in TABLE B are illustrated in examples provided hereinbelow in the Examples section.

As mentioned above, the steps of FIGS. 6 and 7 may be performed by cooperative interaction between the curing setup subsystem 104 (FIG. 1), and one or more curing operators (or other curing experts).

Curing Parts During Production Runs.

FIG. 8 is a flowchart of one embodiment of the steps performed by the curing system 20 when curing parts, particularly during the mass production of a part. The steps of the present figure are typically performed after the flowcharts of FIGS. 6 and 7 have been performed. Accordingly, it is assumed that the curing control database 27 has been appropriated populated with data indicative of initial curing parameter settings, curing adjustments and curing termination conditions. In step 1204 (if necessary) a curing operator interacts with the operator interface 32 (FIG. 1) for inputting to the control system 39 (and in particular, to the curing controller 43) the type of parts to be produced from the curing equipment 45. Such input may include: (i) an identification of the moldable compound 16 to be provided in the mold 18, (ii) an identification of the part configuration (e.g., identification of the mold 18 to be used, locations of sensors 17 in the mold, identification of a part number for the parts to be produced, and/or a description of the parts to be produced, such as, part dimensions and/or shape). In one embodiment, such input may be in the form of electronic computer-aided design files providing a three-dimensional data model of the part to be cured and/or the mold cavity 24. In step 1208, a determination is made as to whether curing parameters can be set according to moldable compound batch identification. If not, then in step 1212, the initial curing parameters are set as composite settings as discussed hereinabove in reference to step 1148 of FIG. 7. Alternatively, if initial curing parameters can be set according to batch, then in step 1216 a selection is made of the batch (B) whose sample tests (e.g., as per FIGS. 6 and 7) are, or are most likely to have, impedance data stream characteristics most similar to those of the current batch from which from which parts are to be produced. Note that step 1216 may be performed by curing (in the curing equipment 45) a small number of parts from the current batch, and comparing the derived impedance process curves with corresponding process curves (for various prior tested batches of the moldable compound) stored in the curing control database 27 for determining a closest match. Additionally or alternatively, such matching may be performed by comparing the composition of the current batch with the composition of previously tested batches. Accordingly, once the batch B is selected, in step 1220, the initial curing parameters for the batch B are set as the initial curing parameters for the current batch. However, it is important to note that it is within the scope of the present curing method and system to interpolate (or otherwise combine) such initial curing parameters from the initial curing parameters of a plurality of previously tested batches. For example, when previously tested batches $B_1$ and $B_2$ both appear to be likely candidates for selection, the initial curing parameter values from both batches may be combined by obtaining, e.g., an average, mean, or weighted sum of the corresponding initial curing parameter values from the batches $B_1$ and $B_2$ (wherein the weighting may be according to a perceived closeness of each of the batches to the current batch).

Regardless of the result from decision step 1208, step 1224 is performed wherein a signal is received by the curing controller 43 indicating that a part is being cured by the curing equipment 45. Subsequently, in step 1228, the sensor measurement units 60 (e.g., one per sensor 17) commences to provide the initial impedance data stream portions for at least one impedance data stream from each of the plurality of sensors 17 to the computer 34 (FIG. 1). More particularly, each sensor 17 provides impedance signals to its corresponding sensor measurement unit 60 which, in turn, provides corresponding impedance signals to the data acquisition card 35, which provides its corresponding output to the demodulation component 42, which, in turn, outputs corresponding resulting impedance data streams to the curing data capture database 23, and additionally, the demodulation component 42 notifies the curing controller 43 that there are impedance data streams (or more precisely portions thereof) to evaluate. Subsequently, the curing controller 43 notifies the curing analysis subsystem 26 that there are (portions of) impedance data streams to be evaluated. The curing analysis subsystem 26 then retrieves the impedance data streams from the curing data capture database 23, performs data smoothing operations on each of the (portions of) impedance data streams to obtain data for corresponding process curves. Subsequently, the curing analysis subsystem 23 evaluates the process curve data for determining the state of the part curing process. The curing analysis subsystem 26 may evaluate such process curves using a plurality of programmatic agents and/or various executable conditions, such as those identified hereinabove in TABLES A and B, for determining when the curing part is: (1) forming and curing appropriately, (2) well formed and fully cured, and (3) for detecting process curve data that is not indicative of a well forming, properly curing part. Thus, the curing analysis subsystem 26 will eventually issue a notification to the curing controller 43 that: (i) the part being cured is expected to be well formed and properly cured, or alternatively, (ii) at least one anomaly in the process curves has been detected that is likely indicative of the part forming and/or curing improperly.

Accordingly, in step 1232, upon receiving such a status notification from the curing analysis subsystem 26, the curing controller 43 determines whether the notification indicates that a well formed and properly cured part has been produced, or that the part is improperly forming and/or improperly curing. Thus, if the part is determined to be properly formed and cured, then in step 1236, the curing controller 43 outputs a command or instruction (via line 28) for instructing the curing equipment 45 to open the mold 18 and release the part therein. Subsequently, in step 1240, the curing controller 43 waits for input (via line 29) indicating that a new part is being cured in the mold 18, or that no further parts are to be currently cured. Thus, upon receiving such input, the curing controller 43 determines (step 1244) whether to shutdown the curing processes within the computer 34 (i.e., perform step 1248), or to continue with the curing process since input is received on line 29 indicating that another part is to be cured. Note that in the later of these two alternatives, step 1208 and subsequent steps following are again performed.

Alternatively, if in step 1232, it is determined that the part may be forming and/or curing improperly, then in step 1252, the curing controller 43 alerts the curing operator via the operator interface 32 that the current part may be defective. Subsequently, in step 1256, the curing controller 43 determines whether at least one action can be identified for reducing the detected anomalies in the impedance data received from the plurality of sensors 17. Note that such a determination by the curing controller 43 may be made using input from the curing analysis subsystem 26. In particular, along with the notification from the curing analysis subsystem 26 that the current part is likely to be improperly forming and/or curing, the curing analysis subsystem may also provide the identification of one or more corrective adjustments to perform to the curing of the current part. TABLE B above provides representative examples of some corrective adjustments that may be performed. If the curing analysis subsystem 26 provides identifications of one or more such corrective adjustments, then in step 1260, the curing controller 43 selects (or more generally, identifies) one or more corresponding commands or instructions to send to the curing equipment 45 (via line 28 and at least one of the input devices 37) for performing the corrective adjustments. Note that in at least some embodiments, the curing controller 43 may select commands or instructions for all such adjustments identified by the curing analysis subsystem 26. However, it is within the scope of embodiments of the curing system 20 that the curing analysis subsystem 26 may provide an ordering of such corrective adjustments so that the curing controller 43 may issue such commands or instructions in a particular order. Subsequently, in step 1264, the curing equipment 45 performs the received commands or instructions for adjusting the curing parameters (e.g., an adjustment to the curing time), and then step 1128 is once again encountered.

In at least some embodiments of the curing system 20, the curing analysis subsystem 26 may have a plurality of possible corrective adjustment alternatives that can be performed. Moreover, the impedance data indicating improper part forming and/or curing may be localized to a particular extent at or near one or more (but not all) of the sensors 17. For example, for three sensors 17 installed in a mold 18, if all three sensors 17 indicate that the part is in its last third of its curing cycle, and a particular one of the sensors shows fluctuations in its process curve, this condition may be an indication of gas byproducts trapped in the part at or near the particular sensor, which may ultimately result in porosity in the portion of the part near the particular sensor. Accordingly, in order to select (or order) such corrective adjustment alternatives, the curing analysis subsystem 26 may give preference to such an alternative that has the least affect on the curing part as a whole. In at least some curing circumstances this means that preference is given to the corrective adjustments that substantially only affect the part in proximity to the one or more sensors outputting the anomalous impedance data. For instance, in the example above wherein a localized part anomaly (i.e., trapped gas byproducts) is identified, the following correspondingly localized corrective adjustments may be given preference over other alternatives: (i) reduce gas byproducts locally by clearing any obstructions in vacuum ports, or (ii) (for subsequent part production) create additional vacuum ports near the particular sensor. In particular, these alternatives may be given preference over more wide ranging part corrective adjustments such as reducing gas byproducts globally by venting the entire mold 18 to correct the current part, or (for subsequent part production) venting the entire mold near the beginning of the curing cycle, which will increase the part curing cycle time.

EXAMPLES AND CASE STUDIES

Figure 9:
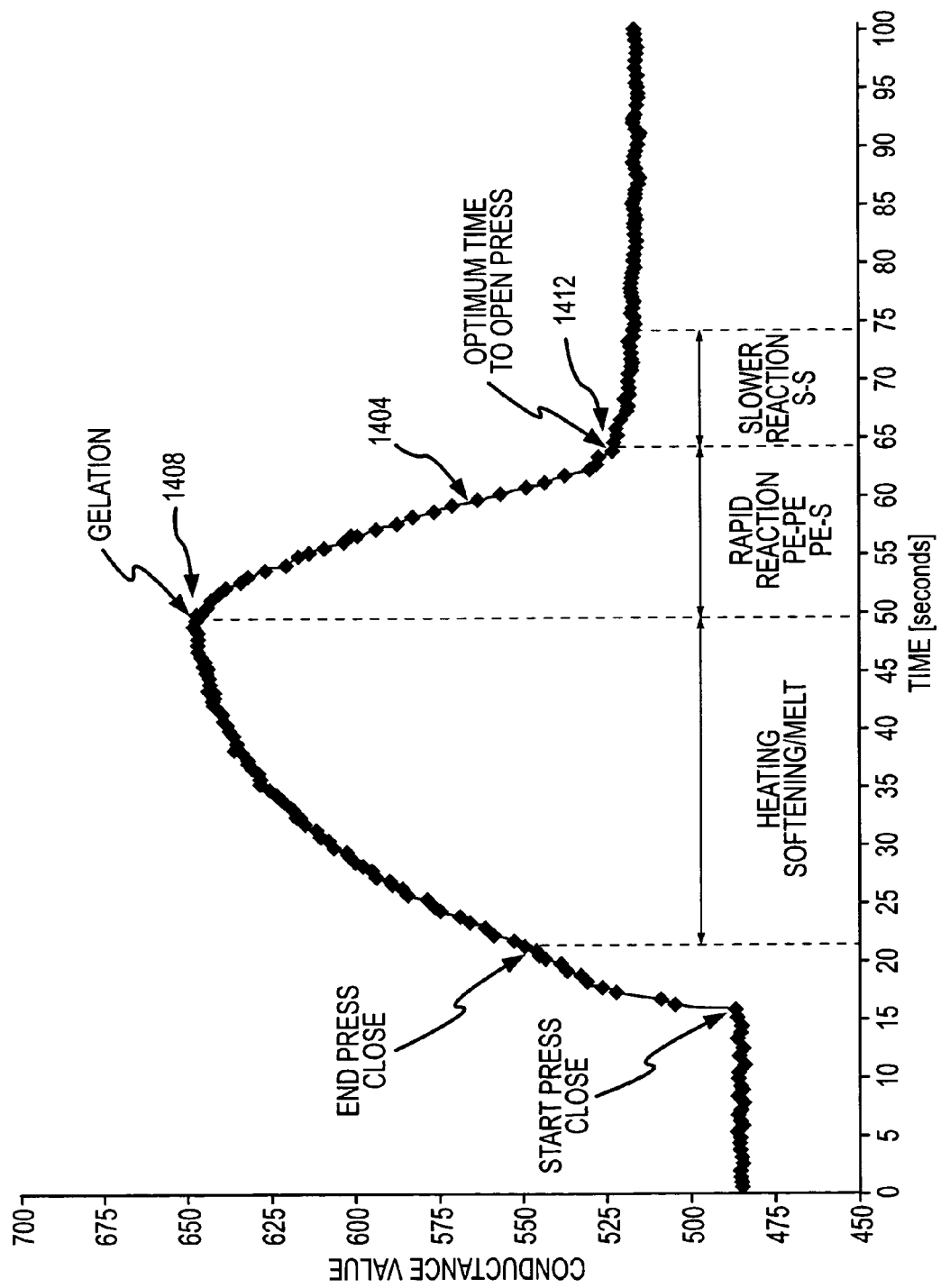
FIG. 9 shows a graph of a typical SMC (polyester, styrene monomer) impedance data stream (and corresponding process curve) with time in seconds shown on the x-axis and the relative conductance shown on the y-axis. Additionally shown are various points where curing events occur (or are expected to occur).

FIG. 9 shows a typical SMC (polyester, styrene monomer) impedance data stream with time in seconds shown on the x-axis and the relative conductance shown on the y-axis. Additionally shown are various points where curing events occur (or are expected to occur). FIG. 9 shows the data points for impedance data stream values (and a corresponding smoothed process curve 1404) for the curing of a part made from SMC as the moldable compound 16. In particular, the x-axis denotes the percentage of time in which the part is expected to cure without use of the curing system 20. Note that the process curve initially rises as: (i) the mold the press closes the mold 18, (ii) the SMC comes into contact with the sensor 17 from which the impedance data stream is obtained, and (iii) this sensor electrically couples with the corresponding grounded capacitor plate 64. The process curve 1404 continues to rise as the moldable compound 16 begins to soften, whereby ionic and molecular entities in the moldable compound are more capable of moving within the sensor's electric field. The process curve 1404 "peaks" (at approximately point 1408) as the moldable compound 16 reaches the point of gelation (i.e., time of the highest rate of cross-linking). After the peak 1408, the impedance values rapidly reduce as the polyester and styrene react and cross-linking restricts the motion of ionic and molecular entities within the sensor's electric field. The process curve 1404 then "tails" to a flat-line condition (at approximately point 1412) as the remaining styrene-styrene reaction takes place. Accordingly, assuming the cure analysis subsystem 26 recognizes such flat-line conditions relatively promptly, and the corresponding process curves of each of the plurality of sensors 17 are detected to be entering such a flat-line condition substantially concurrently, then approximately 20% of the curing time may be saved by using the curing system 20. To perform this analysis of the process curve 1404, the curing analysis subsystem 26 may first identify the peak 1408 of each process curve. Once this point is identified, the curing analysis subsystem 26 then iteratively computes slopes for successive portions of each of the process curves 1404 until a series of slope values near zero are determined for each process curve (such slopes being an indication that a transition to a flat-line condition has been detected). Note, that the proper slope (or sequential collection of slopes) to end the cure of a particular part may be determined empirically by evaluation or observation of one or more resulting part features. For example, blistering before or after part post-bake is often used for SMC parts to identify the point of adequate cure, as one skilled in the art will understand.

Figure 10:
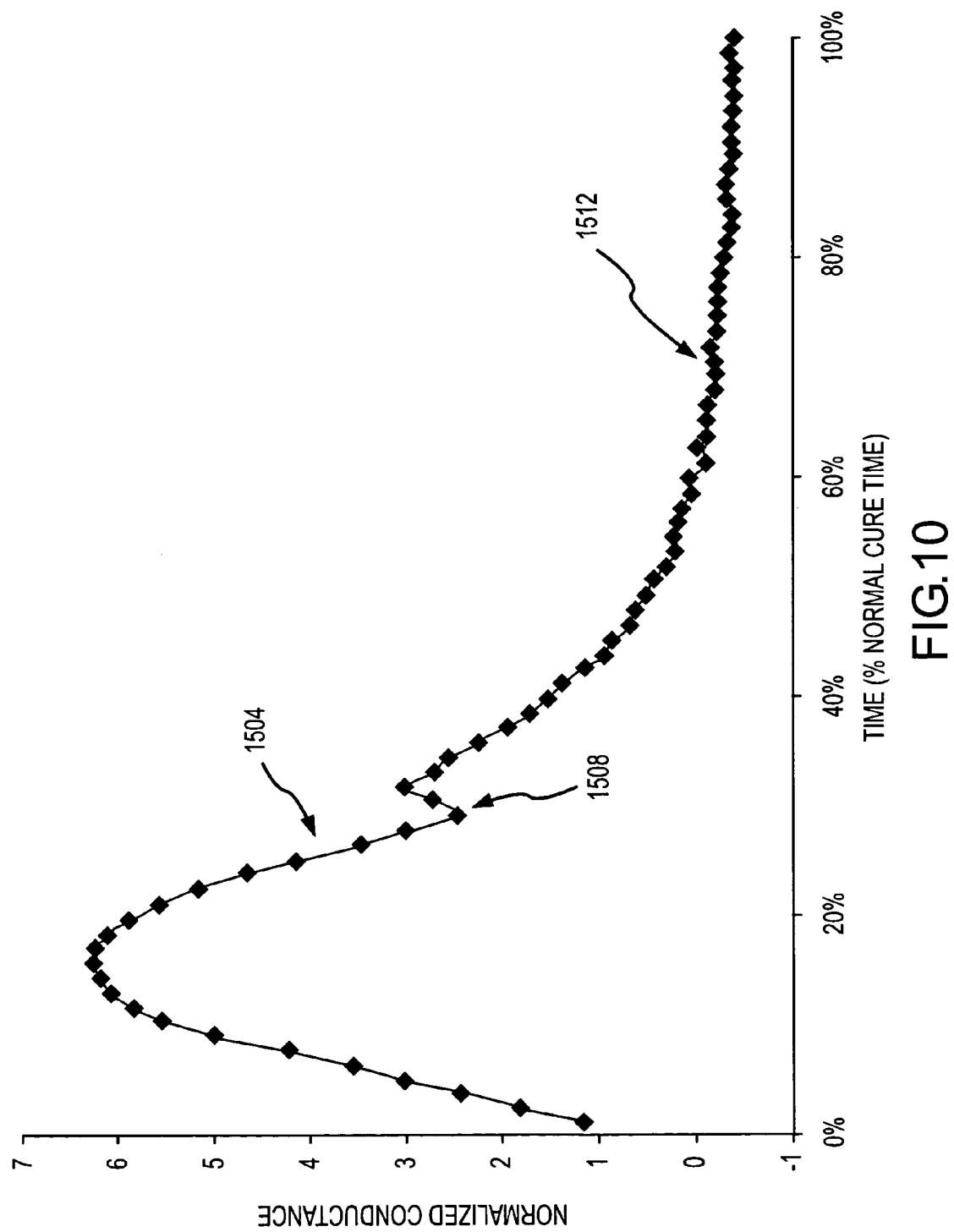
FIG. 10 shows the data points for impedance data stream values (and a corresponding process curve 1404) for the curing of a part made from SMC as the moldable compound 16. In particular, the x-axis denotes the percentage of time in which the part is expected to cure without use of the curing system 20.

FIG. 10 shows a graph of a typical impedance data stream (and its corresponding process curve 1504) for an instrument panel for a light truck produced from SMC, wherein the x-axis times are expressed as a percent of curing rates prior to the use of the curing system 20. The impedance data stream graph in FIG. 10 is slightly different from the one in FIG. 9 due to a change in the press clamp pressure on the mold 18 about 30% of the way through the part's expected curing time (i.e., graphically shown as commencing at point 1508). The curing system 20 was configured so that the curing analysis subsystem 26 identified such flat-lining of process curve 1504 slopes in spite of the increase in impedance values commencing at point 1508. By analyzing sample test parts (e.g., according to the steps of FIG. 6), the proper slope to end part cure was determined empirically by identifying the time when blisters started to occur. A programmatic agent using this proper slope setting was provided to the curing analysis subsystem 26 for use in determining an earlier termination of part curing than was previously being used. Process curve points generally at 1512 were used by the cure analysis subsystem 26 to open the mold press. Through more than 2 months of substantially continuous operation, an embodiment of the curing system 20 configured in this manner reduced the part cure time by 18% on average.

Figure 11:
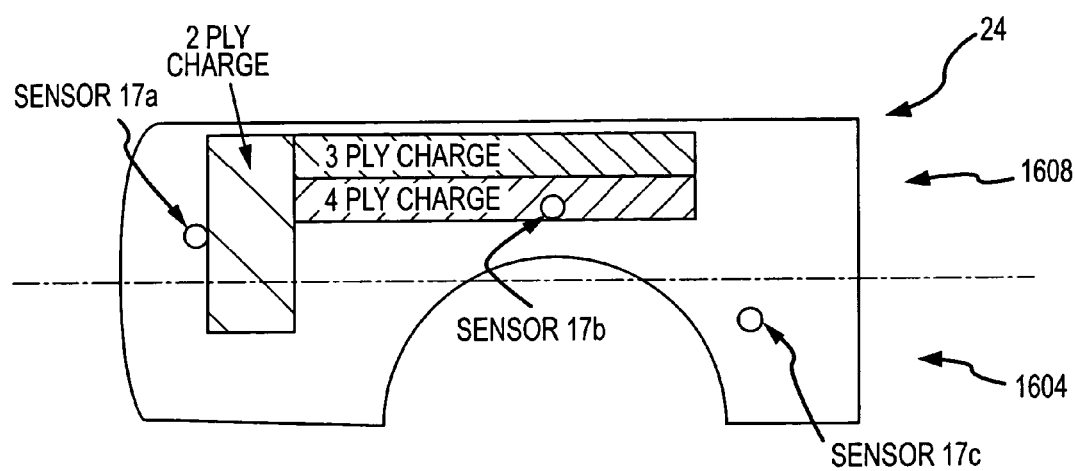
FIG. 11 shows a portion of a mold cavity 28 used in curing an automobile body panel, wherein three sensors 17 are shown within the sidewalls of the mold cavity (i.e., sensors 17a, 17b, and 17c).
Figure 12:
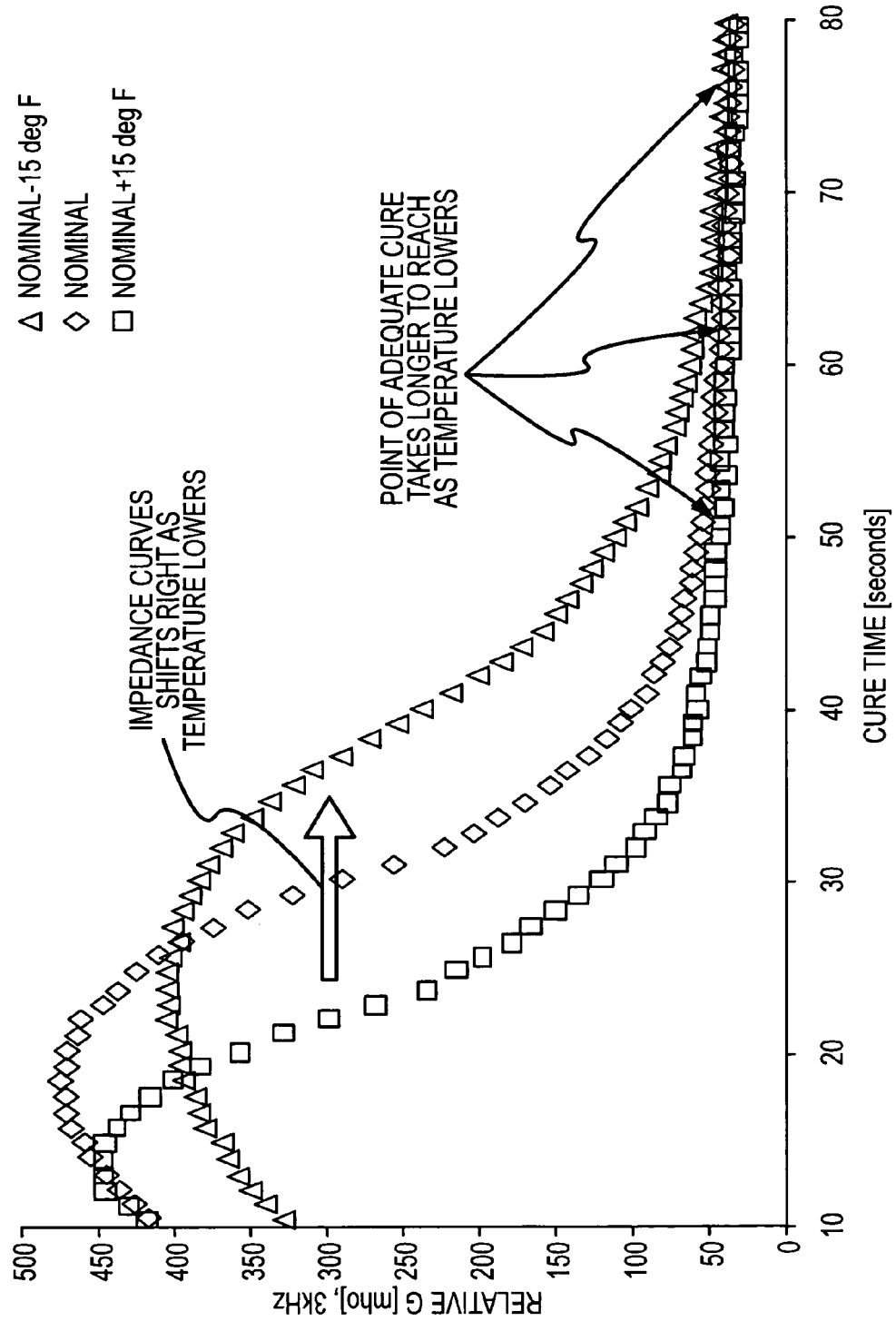
FIG. 12 below shows typical graphs of the resulting impedance data streams (one of the sensors 17) from cures of the automotive body panel of FIG. 11 at the normal temperature (300 degrees F.), at 285 degrees F., and at 315 degrees F.

FIG. 11 shows a portion of a mold cavity 24 used in curing an automobile body panel, wherein three sensors 17 are shown within the sidewalls of the mold cavity (i.e., sensors 17a, 17b, and 17c). Additionally shown are the locations of the charge patterns where layers of SMC (as the moldable compound 16) were provided in the mold cavity 24 for curing into the automobile body panel parts. The normal cure temperature for this part (prior to using the curing method and system disclosed herein) was known to be 300 degree F. for the lower portion 1604 of the mold (i.e., the region approximately below the dashed line), and 310 degrees F. for the upper portion 1608 of the mold (i.e., the region approximately above the dashed line). The normal cure time (prior to using the curing method and system disclosed herein) was 105 seconds per part. To determine the impact on impedance data streams from the sensors 17a–17c caused by mold cavity 28 temperature variation, temperatures were intentionally changed ±15 degrees F. from the normal 300 degrees F. Impedance data streams were collected for numerous part cures at a plurality of temperatures in the range 285 to 315 degrees F. FIG. 12 below shows typical graphs of the resulting impedance data streams from cures at the normal temperature (300 degrees F.), at 285 degrees F., and at 315 degrees F. Subsequent test part evaluation showed that adequate cure under nominal conditions was reached at approximately 65 seconds. Additionally, FIG. 12 shows that the impedance data stream shifts to the right as the curing temperature is lowered. This shift reflects a slower melt and reaction rate as expected when the temperature is lowered. However, for each temperature, the slope of the corresponding process curve was near zero when the part (or portion thereof) was properly cured. Accordingly, by incorporating this information into a programmatic agent and/or condition accessible by the curing analysis subsystem 26, an embodiment of the curing system 20 was able to reduce the average part curing time to 64 seconds.

Figure 13:
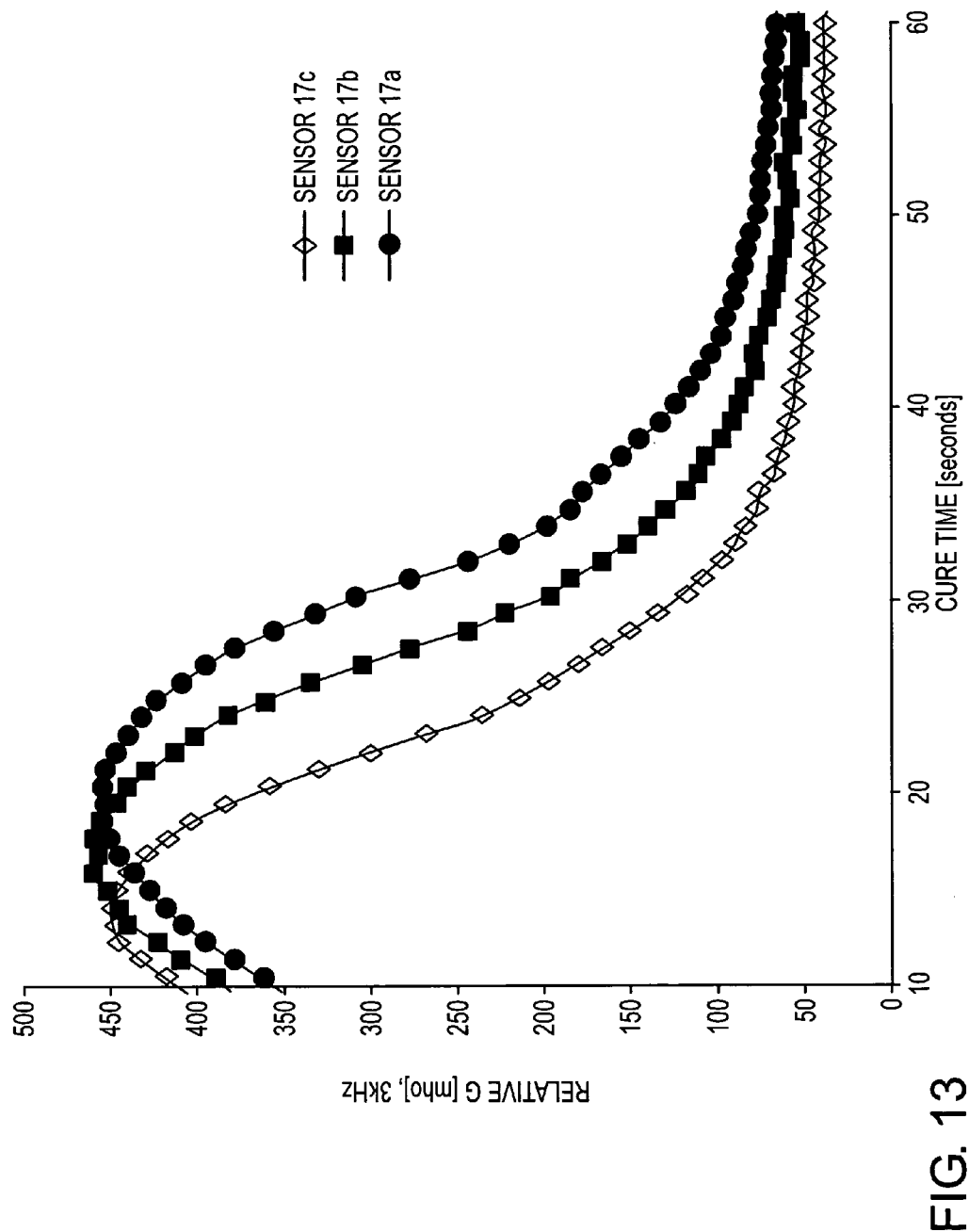
FIG. 13 shows the graphs of typical impedance data streams (and their corresponding process curves) for the SMC charge placement shown in FIG. 11 prior to using the curing system 20 to monitor and adjust part curing.
Figure 14:
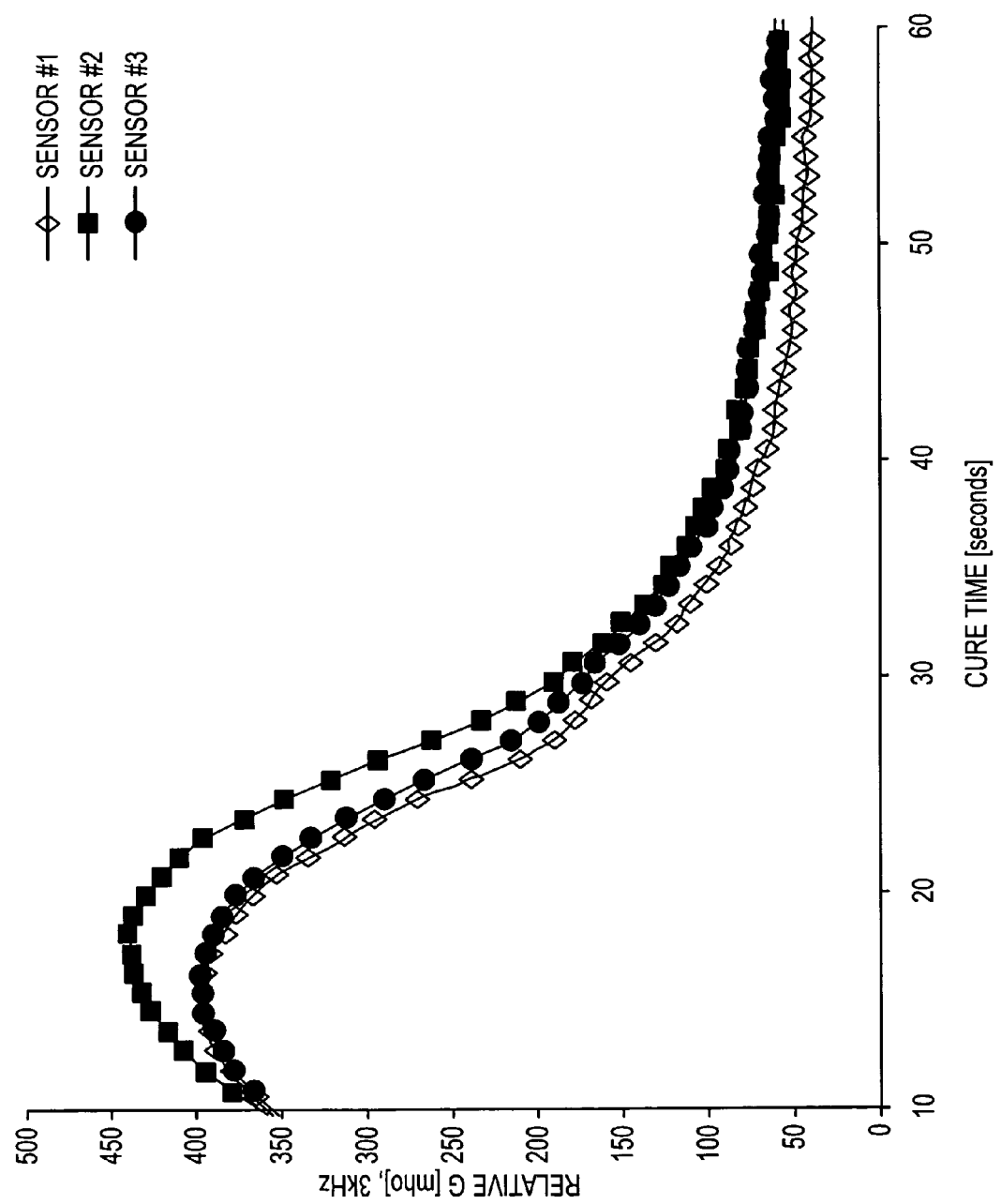
FIG. 14 shows the graphs of typical impedance data streams (and their corresponding process curves) after repositioning of the SMC charges in the mold cavity 28 for the automobile body panel cured in the mold cavity 28 of FIG. 11.

FIG. 13 shows the graphs of typical impedance data streams (and their corresponding process curves) for the three sensors 17a, 17b, and 17c shown in FIG. 11, prior to using the curing system 20 to monitor and adjust part curing, wherein the SMC charge placement is as shown in FIG. 11. Note that different portions of the parts were fully curing at substantially different times as indicated by the different times that each of the process curves achieved a near zero process curve slope. In fact, tests indicated that the moldable compound 16 (SMC) cured more rapidly near sensor 17c. Accordingly, during performance of the steps of FIG. 6, an additional step was performed of attempting to provide initial curing conditions that would bring the cure rates for different portions of the part closer to one another. In particular, the charges of FIG. 11 were rearranged so that at least some of the charges were closer to sensor 17c (i.e., approximately 6 inches closer). FIG. 14 shows the graphs of typical impedance data streams (and their corresponding process curves) after re-positioning of the SMC charges in the mold cavity 28. Moreover, as can also be seen in FIG. 14, the gelation points are closer together for the three sensors.

While various embodiments of the present invention have been described in detail, it is apparent that modifications and adaptations of those embodiments will occur to those skilled in the art. It is to be expressly understood, however, that modifications and adaptations are within the scope of the present invention, as set forth in the following claims.

What is claimed is:

1. A method for curing a plurality of instances of a part, comprising:
    providing a plurality of sensors in a mold for curing the part instances, wherein each sensor is for generating signals related to an impedance within a current one of the part instances curing within the mold;
    for each sensor, receiving a corresponding time series of impedance measurements for measuring the signals generated by the sensors when the current part instance is curing;
    determining at least first impedance related data obtained from the corresponding time series of impedance measurements for a first of the sensors;
    determining second impedance related data from the corresponding time series of impedance measurements for a second of the sensors;
    identifying an association between: (a) a relationship between the first and second impedance related data for the current part instance, and (b) status information indicative of at least one property of the current part instance;
    obtaining, when the status information indicates a defect in the current part instance, curing data indicative of at least one corrective action for one of: the current part instance, or a subsequent one of the part instances; and
    transmitting at least one instruction, obtained from the curing data, to a curing equipment component used in curing the part instances in the mold, the transmission resulting in the curing equipment component changing a curing condition consistent with the corrective action.

2. The method of claim 1, wherein the first sensor provides first impedance data for a first portion of the part instances, and the second sensor provides second impedance data for a second portion of the part instances, wherein: (a) the first portion and the second portions differ in thickness by 25% or more; (b) at least one of the first and second sensors is adjacent to a bend in the part instances, (c) the first and second sensors are spaced apart at least two thirds of a maximal dimension of each part instance, and (d) the first and second sensors are spaced apart at least two thirds of the maximal distance a moldable compound must flow, during curing, from where it is introduced into the mold.

3. The method of claim 1, wherein at least one of the first and second sensors includes two electrodes insulated from one another, and wherein one of the two electrodes surrounds the other electrode.

4. The method of claim 1, wherein the corresponding time series of impedance measurements for the first and second sensors are determined using at least one non-bridged circuit.

5. The method of claim 1, wherein the corresponding time series of impedance measurements for the first and second sensors are determined using at least one bridged circuit.

6. The method of claim 1, wherein the first impedance related data includes one of: (a) an identification of a portion of the time series of impedance measurement for the first sensor having a substantially zero slope, (b) information relating to whether values of the time series of impedance measurements for the first sensor increase at least 10% from a value substantially at the initiation of curing of the current part instance, and (c) information relating to whether values of the time series of impedance measurements yield a plurality fluctuations of at least 5% of a maximum variation in the time series of impedance measurements.

7. The method of claim 6, wherein the second impedance related data includes a variation from the first impedance related data, wherein the variation correlates with the defect in the current part instance.

8. The method of claim 1, wherein the association is determined from a predetermined correlation between an identification for the defect, and a plurality of time series of impedance measurements for each of a plurality of previously cured instances of at least one part type.

9. The method of claim 1, wherein the status information includes an identification of the at least one property as one of:
(i) a desired range in one of: tensile strength, compression strength, dynamic stiffness, and dimensional consistency, and
(ii) indications of one or more under cure conditions.

10. The method of claim 1, wherein the defect identifies the current part instance as one of: (i) a defective part having voids, (ii) a defective porous part, (iii) an under cured part, (iv) an over cured part, (v) a non-well formed part, and (vi) a defective part due to not having a desired property.

11. The method of claim 1, wherein corrective action includes one of: (a) changing a curing time for one of the current part instance, or a subsequent one of the part instances, (b) changing a curing temperature for one of the current part instance, or a subsequent one of the part instances, (c) changing a tonnage for one of the current part instance, or a subsequent one of the part instances, (d) clearing an obstruction in a vacuum port, and (e) adding one or more vacuum ports.

12. The method of claim 1, wherein the step of transmitting includes generating the at least one instruction at a computer, wherein the computer performs a step of determining a preference between the at least one corrective action, and a different corrective action.

13. The method of claim 12, wherein the preference is dependent upon an extent of the part affected by each of the at least one corrective action, and the different corrective action.

14. An apparatus for curing a plurality of instances of a part in a mold, wherein the mold has a plurality of sensors, each sensor for generating signals related to impedances of a current one of the part instances curing within the mold, comprising:
for each sensor, a corresponding sensor measurement unit for providing one or more electrical signals to the sensor, and for obtaining corresponding impedance related data from the sensor when the current part instance is curing;
a first one or more components for determining:
(a) first impedance related data obtained from the corresponding impedance related data from a first of the sensors; and
(b) second impedance related data from the corresponding impedance related data from a second of the sensors;
wherein the first and second impedance data are each a result of a predetermined computation, the computation including a determination of at least one of: a slope, a local maximum, and local minimum, a extent of a curve that is substantially flat, an area, a rate of change of a slope, and an inflection point;
a second one or more components for identifying an association between: (a) a difference between the first and second impedance related data for the current part instance, and (b) status information indicative of at least one property of the curing of the current part instance;
a controller for obtaining information indicative of at least one corrective action for correcting a defect in one of: the current part instance, or a subsequent one of the part instances, wherein the information varies with a varying of the status information; and
a third one or more components for communicating at least one instruction issued by the controller, to a curing equipment component used in curing the part instances in the mold, the communication resulting in the curing equipment component changing a curing condition consistent with the corrective action, wherein the at least one instruction is obtained using the information indicative of the at least one corrective action.

15. The apparatus of claim 14, wherein the second one or more components includes a data repository of storing a plurality of associations for associating (a) a difference between impedance related data from each of a group of two or more of the sensors, and (b) status information indicative of at least one property of a part instance previously cured using at least one of: the mold, and the curing equipment component.

16. The method of claim 1, wherein the impedance measurements includes one of: (i) impedance (Z) being a measure of the total opposition to current flow in an alternating current circuit, (ii) a phase angle, (iii) a resistance, (iv) reactance, (v) a conductance, and a (vi) capacitance.

17. The method of claim 1, wherein the part instances are cured from one of: (a) a polymeric moldable compound, (b) a stryrene monomer compound, (c) a phenolic material, and (d) a thermosetting plastic.

18. A method for curing a plurality of instances of a part, comprising:
providing a plurality of sensors in a mold for curing the part instances, wherein each sensor is for generating signals related to an impedance within a current one of the part instances curing within the mold;
for each sensor, receiving a corresponding time series of impedance measurements for measuring the signals generated by the sensors when the current part instance is curing;

determining at least first impedance related data obtained from the corresponding time series of impedance measurements for a first of the sensors;

determining second impedance related data from the corresponding time series of impedance measurements for a second of the sensors;

identifying an association between: (a) a relationship between the first and second impedance related data for the current part instance, and (b) status information indicative of at least one property of the current part instance;

obtaining, when the status information indicates a defect in the current part instance, curing data indicative of at least one corrective action for one of: the current part instance, or a subsequent one of the part instances; and transmitting at least one instruction, obtained from the curing data, to a curing equipment component used in curing the part instances in the mold, the transmission resulting in the curing equipment component changing a curing condition consistent with the corrective action;

wherein the first sensor provides first impedance data for a first portion of the part instances, and the second sensor provides second impedance data for a second portion of the part instances, wherein: (a) the first portion and the second portions differ in thickness by 25% or more; (b) at least one of the first and second sensors is adjacent to a bend in the part instances, (c) the first and second sensors are spaced apart at least two thirds of a maximal dimension of each part instance, and (d) the first and second sensors are spaced apart at least two thirds of the maximal distance a moldable compound must flow, during curing, from where it is introduced into the mold.

19. An apparatus for curing a plurality of instances of a part in a mold, wherein the mold has a plurality of sensors, each sensor for generating signals related to impedances of a current one of the part instances curing within the mold, comprising:

for each sensor, a corresponding sensor measurement unit for providing one or more electrical signals to the sensor, and for obtaining corresponding impedance related data from the sensor when the current part instance is curing;

a first one or more components for determining:
(a) first impedance related data obtained from the corresponding impedance related data from a first of the sensors; and
(b) second impedance related data from the corresponding impedance related data from a second of the sensors;
wherein the first and second impedance data are each a result of a predetermined computation, the computation including a determination of at least one of: a slope, a local maximum, and local minimum, a extent of a curve that is substantially flat, an area, a rate of change of a slope, and an inflection point;

a second one or more components for identifying an association between: (a) a result from a comparison between the first and second impedance related data for the current part instance, and (b) status information indicative of at least one property of the curing of the current part instance;

a controller for obtaining information indicative of at least one corrective action for correcting a defect in one of: the current part instance, or a subsequent one of the part instances, wherein the information varies with a varying of the status information; and a third one or more components for communicating at least one instruction issued by the controller, to a curing equipment component used in curing the part instances in the mold, the communication resulting in the curing equipment component changing a curing condition consistent with the corrective action, wherein the at least one instruction is obtained using the information indicative of the at least one corrective action.

20. The method of claim 18, wherein the defect identifies the current part instance as one of: (i) a defective part having voids, (ii) a defective porous part, (iii) an under cured part, (iv) an over cured part, (v) a non-well formed part, and (vi) a defective part due to not having a desired property.

21. The method of claim 20, wherein the desired property includes one of: a desired range in one of: tensile strength, a compression strength, a dynamic stiffness, and a dimensional consistency.

22. The method of claim 1, wherein corrective action includes the clearing an obstruction in a vacuum port.

23. The method of claim 6, wherein the first impedance related data includes information relating to whether values of the time series of impedance measurements yield a plurality fluctuations of at least 5% of a maximum variation in the time series of impedance measurements.

24. The method of claim 1, wherein the relationship between the first and second impedance related data includes an offset in time between corresponding impedance related values.

25. The method of claim 24, wherein the offset is at least 10% of a total expected curing time for the current part instance.

26. The method of claim 1, wherein the relationship between the first and second impedance related data includes an offset in impedance magnitude between corresponding impedance related values.

27. The method of claim 26, wherein the offset is at least 50% greater.

28. The method of claim 1, further including determining the relationship between the first and second impedance related data as a difference in slope values.

29. The method of claim 28, wherein the step of determining the relationship includes determining a maximum slope from each of the first and second impedance related data between: (a) the start of the cure of the current part instance, and (b) a corresponding maximum impedance value for the first or second impedance related data values from which the maximum slope is determined.

30. The method of claim 29, wherein the step of determining the relationship includes comparing the maximum slopes for determining a difference of more than a predetermined amount.

31. The method of claim 28, wherein the step of determining the relationship includes determining a difference in a maximum slope from each of the first and second impedance related data;

wherein each maximum slope is determined between: (a) a corresponding maximum impedance value for the first or second impedance related data values used in determining the maximum slope, and (b) a corresponding point of maximum rate of change for the first or second impedance related data values used in determining the maximum slope.

32. The method of claim 10, wherein the desired property includes one of: a desired range in one of: tensile strength, a compression strength, a dynamic stiffness, and a dimensional consistency.

* * * * *